US012595933B2

(12) United States Patent
Zhang et al.

(10) Patent No.: US 12,595,933 B2
(45) Date of Patent: Apr. 7, 2026

(54) AIR PRESSURE DETECTION DEVICE, COMBUSTOR, GAS WATER HEATER, METHOD AND APPARATUS FOR CONTROLLING GAS WATER HEATER, AND COMPUTER-READABLE STORAGE MEDIUM

(71) Applicants: WUHU MIDEA KITCHEN AND BATH APPLIANCES MFG. CO., LTD., Wuhu (CN); MIDEA GROUP CO., LTD., Foshan (CN)

(72) Inventors: Yanjing Zhang, Wuhu (CN); Huan Sun, Wuhu (CN); Jiqing Ma, Wuhu (CN); Guorong Liang, Wuhu (CN); Zuan Lu, Wuhu (CN)

(73) Assignees: WUHU MIDEA KITCHEN AND BATH APPLIANCES MFG. CO., LTD., Wuhu (CN); MIDEA GROUP CO., LTD., Foshan (CN)

( * ) Notice: Subject to any disclaimer, the term of this patent is extended or adjusted under 35 U.S.C. 154(b) by 415 days.

(21) Appl. No.: 18/262,381

(22) PCT Filed: Feb. 18, 2022

(86) PCT No.: PCT/CN2022/076965
§ 371 (c)(1),
(2) Date: Jul. 21, 2023

(87) PCT Pub. No.: WO2022/174822
PCT Pub. Date: Aug. 25, 2022

(65) Prior Publication Data
US 2024/0085058 A1      Mar. 14, 2024

(30) Foreign Application Priority Data

Feb. 19, 2021  (CN) .......................... 202120379583.9
Apr. 19, 2021  (CN) .......................... 202110433654.3

(51) Int. Cl.
*F24H 9/20* (2022.01)
*F23D 14/72* (2006.01)
(Continued)

(52) U.S. Cl.
CPC ............... *F24H 9/20* (2013.01); *F23D 14/72* (2013.01); *F23N 5/242* (2013.01); *F24H 8/006* (2013.01);
(Continued)

(58) Field of Classification Search
CPC .......... F24H 9/20; F24H 8/006; F24H 9/0026; F24H 9/16; F24H 15/242; F24H 15/345;
(Continued)

(56) References Cited

U.S. PATENT DOCUMENTS

2019/0032959 A1*   1/2019   Tsuda ........................ F24H 1/52

FOREIGN PATENT DOCUMENTS

CN            102192808 A        9/2011
CN            103727676 A        4/2014
(Continued)

OTHER PUBLICATIONS

CN-103727676-B translation (Year: 2025).*
(Continued)

*Primary Examiner* — Michael G Hoang
*Assistant Examiner* — Kurt J Wolford
(74) *Attorney, Agent, or Firm* — K&L Gates LLP

(57) ABSTRACT

Provided is a gas water heater. The gas water heater includes a pre-mixer, a combustor having a combustion chamber in communication with a premixing chamber, a condensate water assembly configured to receive and discharge condensate water, and an apparatus for controlling the gas water heater. The pre-mixer includes a premixing chamber and an air intake fan that is configured to supply air to the combustion chamber. The air intake fan is disposed in the
(Continued)

Acquiring an intake air pressure threshold ⌐ S100

Acquiring an air intake pressure value of an air intake fan ⌐ S200

Controlling, in response to determining based on the air intake pressure value and the intake air pressure threshold that a water seal of the condensate water assembly is at risk of being blown away, the gas water heater to stop operation ⌐ S300 premixing chamber. The method includes: acquiring an intake air pressure threshold; acquiring an air intake pressure value of the air intake fan; and controlling, in response to determining based on the air intake pressure value and the intake air pressure threshold that a water seal of the condensate water assembly is at risk of being blown away, the gas water heater to stop operation.

16 Claims, 7 Drawing Sheets

(51) Int. Cl.

| | | |
|---|---|---|
| *F23N 5/24* | (2006.01) | |
| *F24H 8/00* | (2022.01) | |
| *F24H 9/00* | (2022.01) | |
| *F24H 9/16* | (2022.01) | |
| *F24H 15/116* | (2022.01) | |
| *F24H 15/242* | (2022.01) | |
| *F24H 15/345* | (2022.01) | |
| *F24H 15/36* | (2022.01) | |
| *F24H 15/421* | (2022.01) | |
| *G01L 7/00* | (2006.01) | |

(52) U.S. Cl.
CPC ............. *F24H 9/0026* (2013.01); *F24H 9/16* (2013.01); *F24H 15/242* (2022.01); *F24H 15/345* (2022.01); *F24H 15/36* (2022.01); *F24H 15/421* (2022.01); *F24H 9/2042* (2013.01); *F24H 15/116* (2022.01); *G01L 7/00* (2013.01)

(58) Field of Classification Search
CPC ...... F24H 15/36; F24H 15/421; F24H 9/2042; F24H 15/116; F23D 14/72; F23N 5/242; G01L 7/00
See application file for complete search history.

(56) References Cited

FOREIGN PATENT DOCUMENTS

| | | | | | |
|---|---|---|---|---|---|
| CN | 103727676 B | * | 1/2017 | | |
| CN | 110186193 A | | 8/2019 | | |
| CN | 209295450 U | | 8/2019 | | |
| CN | 110425744 A | * | 11/2019 | .......... | F24H 9/2035 |
| CN | 110895042 A | | 3/2020 | | |
| CN | 110986098 A | | 4/2020 | | |
| CN | 111238052 A | * | 6/2020 | .......... | F24H 9/2035 |
| CN | 211011894 U | | 7/2020 | | |
| CN | 112283709 A | | 1/2021 | | |
| CN | 214309245 U | | 9/2021 | | |
| JP | 2008170097 A | | 7/2008 | | |
| KR | 20150137571 A | | 12/2015 | | |

OTHER PUBLICATIONS

CN-110425744-A translation (Year: 2025).*
CN-111238052-A translation (Year: 2025).*
ISR mailed May 23, 2022 for International Application No. PCT/CN2022/076965.
Second OA received in CN Application No. 202110433654.3; mailed May 28, 2024.
Grant Notice & Supplementary Search received in CN Application No. 202110433654.3; mailed Jul. 25, 2024.
Written Opinion of the ISA received in PCT/CN2022/076965; mailed May 23, 2022.
First OA&Search Report received in CN Application No. 202110433654.3; mailed Nov. 23, 2023.

* cited by examiner

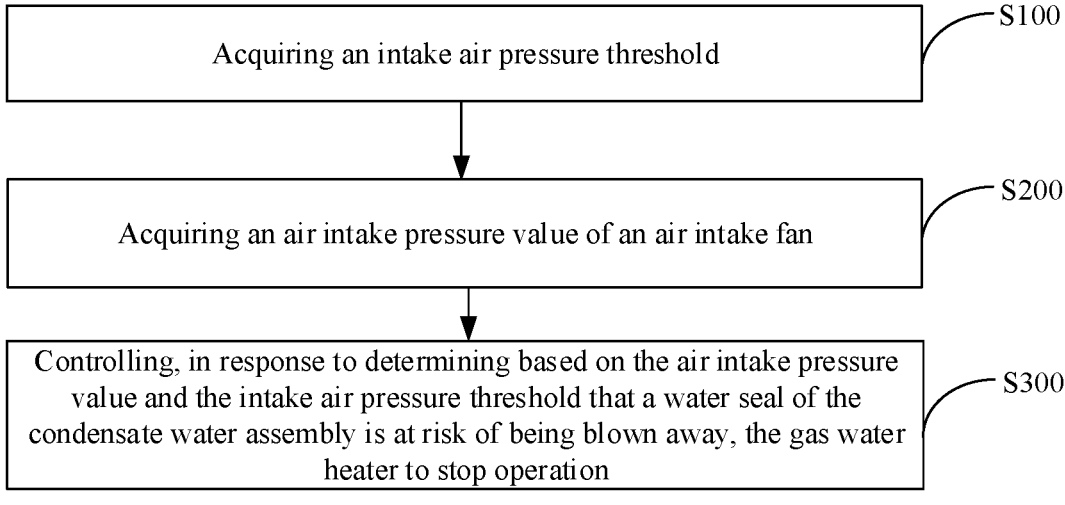

Acquiring an intake air pressure threshold ⟋ S100

Acquiring an air intake pressure value of an air intake fan ⟋ S200

Controlling, in response to determining based on the air intake pressure value and the intake air pressure threshold that a water seal of the condensate water assembly is at risk of being blown away, the gas water heater to stop operation ⟋ S300

FIG. 1

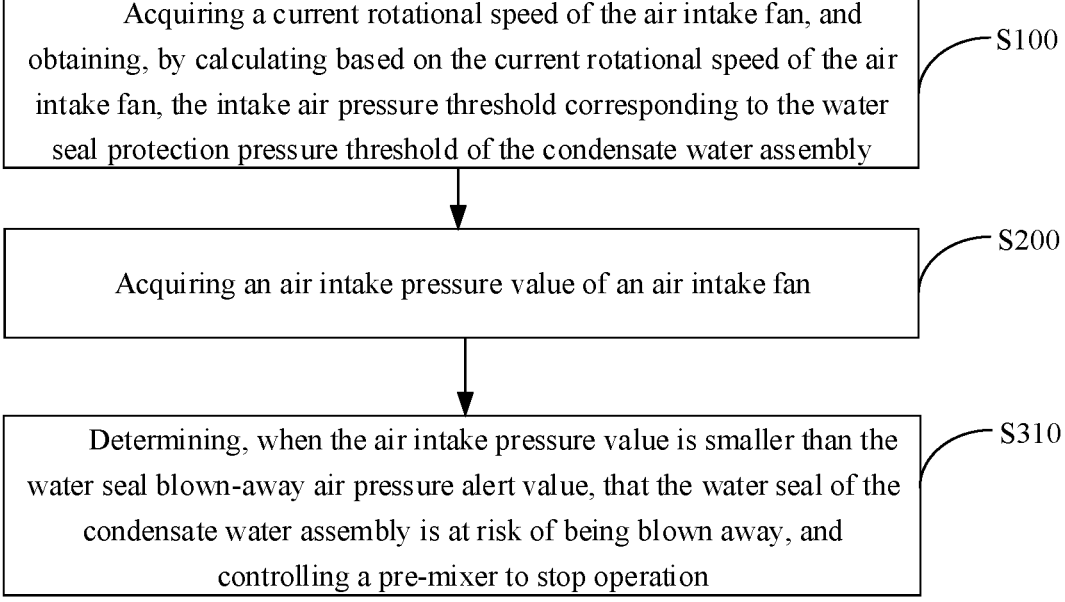

Acquiring a current rotational speed of the air intake fan, and obtaining, by calculating based on the current rotational speed of the air intake fan, the intake air pressure threshold corresponding to the water seal protection pressure threshold of the condensate water assembly ⟋ S100

Acquiring an air intake pressure value of an air intake fan ⟋ S200

Determining, when the air intake pressure value is smaller than the water seal blown-away air pressure alert value, that the water seal of the condensate water assembly is at risk of being blown away, and controlling a pre-mixer to stop operation ⟋ S310

FIG. 2

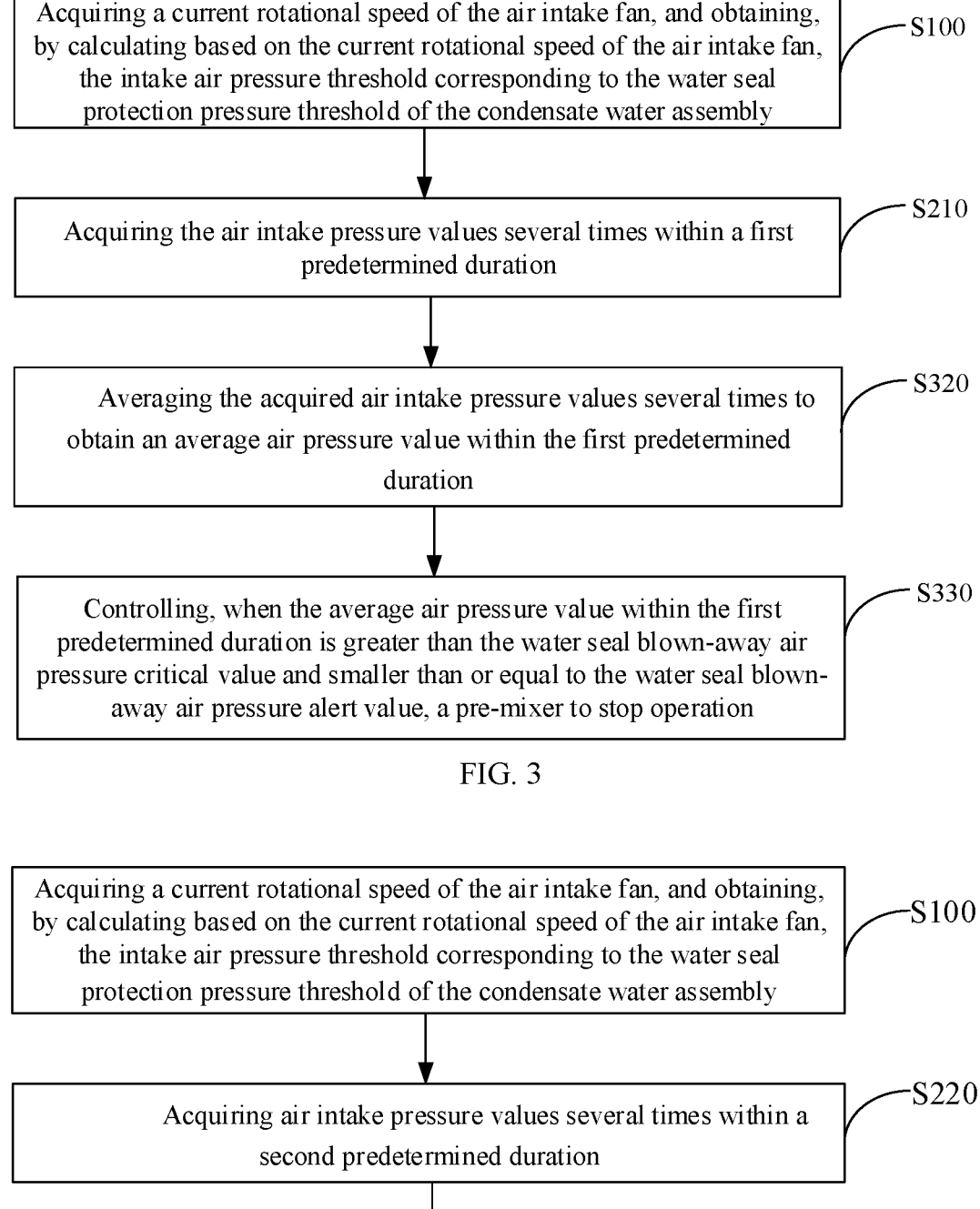

Acquiring a current rotational speed of the air intake fan, and obtaining, by calculating based on the current rotational speed of the air intake fan, the intake air pressure threshold corresponding to the water seal protection pressure threshold of the condensate water assembly ⟋ S100

Acquiring the air intake pressure values several times within a first predetermined duration ⟋ S210

Averaging the acquired air intake pressure values several times to obtain an average air pressure value within the first predetermined duration ⟋ S320

Controlling, when the average air pressure value within the first predetermined duration is greater than the water seal blown-away air pressure critical value and smaller than or equal to the water seal blown-away air pressure alert value, a pre-mixer to stop operation ⟋ S330

FIG. 3

Acquiring a current rotational speed of the air intake fan, and obtaining, by calculating based on the current rotational speed of the air intake fan, the intake air pressure threshold corresponding to the water seal protection pressure threshold of the condensate water assembly ⟋ S100

Acquiring air intake pressure values several times within a second predetermined duration ⟋ S220

Controlling, when a minimum air pressure value of the air pressure values within the second predetermined duration is smaller than the water seal blown-away air pressure critical value, the gas water heater to stop operation ⟋ S340

FIG. 4

AIR PRESSURE DETECTION DEVICE, COMBUSTOR, GAS WATER HEATER, METHOD AND APPARATUS FOR CONTROLLING GAS WATER HEATER, AND COMPUTER-READABLE STORAGE MEDIUM

CROSS-REFERENCES TO RELATED APPLICATIONS

The present disclosure is a national phase application of International Application No. PCT/CN2022/076965, filed on Feb. 18, 2022, which claims priorities to Chinese Patent Application No. 202110433654.3, filed on Apr. 19, 2021, and Chinese Patent Application No. 202120379583.9, filed on Feb. 19, 2021, the entireties of which are herein incorporated by reference.

FIELD

The present disclosure relates to the field of water heater technologies, and particularly, to a gas water heater, a method and apparatus for controlling the gas water heater, and a computer-readable storage medium.

BACKGROUND

In the related art, during operation of a gas water heater, an amount of gas combustion heat required to supply hot water is usually controlled through controlling a gas flow. For a gas water heater provided with a fan, a rotational speed of the fan is also controlled to provide a corresponding air volume, to enable the gas water heater to maintain combustion and operation in good conditions. Design parameters of a control board program of the gas water heater are measured and set in advance when each parameter of the gas water heater is in a standard condition. However, the gas water heater is prone to safety hazards in the event of abnormalities.

SUMMARY

In one embodiment of the present disclosure, a gas water heater, a method and apparatus for controlling the gas water heater, and a computer-readable storage medium are proposed, which aims to increase use safety of gas water heaters.

To achieve the above embodiment, the present disclosure provides a method for controlling a gas water heater. The gas water heater includes a combustion chamber having a combustor, a fan configured to supply air to the combustion chamber, and a condensate water assembly configured to receive and discharge condensate water. The method for controlling the gas water heater includes: acquiring an intake air pressure threshold; acquiring an air intake pressure value of an air intake fan; and controlling, in response to determining based on the air intake pressure value and the intake air pressure threshold that a water seal of the condensate water assembly is at risk of being blown away, the gas water heater to stop operation.

The acquiring the intake air pressure threshold includes: acquiring a current rotational speed of the air intake fan; and obtaining, by calculating based on the current rotational speed of the air intake fan, the intake air pressure threshold corresponding to the water seal protection pressure threshold of the condensate water assembly.

In some embodiments, the intake air pressure threshold includes a water seal blown-away air pressure alert value and a water seal blown-away air pressure critical value smaller than the water seal blown-away air pressure alert value.

In some embodiments, the controlling, in response to determining based on the air intake pressure value and the intake air pressure threshold that the water seal of the condensate water assembly is at risk of being blown away, the air intake fan to stop the air intake operation includes: determining, when the air intake pressure value is smaller than the water seal blown-away air pressure alert value, that the water seal of the condensate water assembly is at risk of being blown away, and controlling a pre-mixer to stop operation.

In some embodiments, the acquiring the air intake pressure value of the air intake fan includes: acquiring the air intake pressure values several times within a first predetermined duration. The controlling, in response to determining based on the air intake pressure value and the intake air pressure threshold that the water seal of the condensate water assembly is at risk of being blown away, the air intake fan to stop the air intake operation includes: averaging the acquired air intake pressure values several times to obtain an average air pressure value within the first predetermined duration; and controlling, when the average air pressure value within the first predetermined duration is greater than the water seal blown-away air pressure critical value and smaller than the water seal blown-away air pressure alert value, a pre-mixer to stop operation.

In some embodiments, the acquiring the air intake pressure value of the air intake fan includes: acquiring the air intake pressure values several times within the first predetermined duration. The determining, when the air intake pressure value is smaller than the water seal blown-away air pressure alert value, that the water seal of the condensate water assembly is at risk of being blown away, and controlling the pre-mixer to stop the air intake operation includes: acquiring air pressure values of the pre-mixer several times within a second predetermined duration; and controlling, when a minimum air pressure value of the air pressure values within the second predetermined duration is smaller than the water seal blown-away air pressure critical value, the gas water heater to stop operation.

In some embodiments, the controlling, in response to determining based on the water seal blown-away threshold and the air intake pressure value that the water seal of the condensate water assembly is blown away, the pre-mixer to stop the air intake operation includes: controlling, in response to acquiring that a difference between two adjacent air intake pressure values is greater than a predetermined threshold, the pre-mixer to stop the air intake operation.

The present disclosure further provides an apparatus for controlling a gas water heater. The apparatus for controlling the gas water heater includes: a processor; a memory; and a gas water heater control program stored on the memory and executable on the processor. The gas water heater control program, when executed by the processor, implements the steps of the above-mentioned method for controlling the gas water heater.

The present disclosure further provides a gas water heater. The gas water heater is provided with a cold-water inlet pipe and a hot-water outlet pipe. The gas water heater includes: a pre-mixer; a combustor, a condensate water assembly, and the above-mentioned apparatus for controlling the gas water heater. The pre-mixer includes a premixing chamber and an air intake fan disposed in the premixing chamber. The combustor has a combustion chamber and is in communication with the premixing chamber. The condensate water assembly is in communication with the combustion chamber. The apparatus for controlling the gas water heater is configured to control, in response to determining based on the acquired air intake pressure value and the intake air pressure threshold that the water seal of the condensate water assembly is at risk of being blown away, the gas water heater to stop operation.

In some embodiments, the gas water heater further includes an air pressure detection device configured to detect an air intake air pressure value in the pre-mixer. A pressure measurement hole of the air pressure detection device is formed in the pre-mixer.

In some embodiments, the gas water heater further includes a housing. The combustor and the condensate water assembly are disposed in the housing. A smoke exhaust pipe is disposed on the housing.

In some embodiments, the pre-mixer includes: an air inlet; a gas inlet; and a venturi tube having a first air intake inlet in communication with the air inlet, a second air intake inlet in communication with the gas inlet, and an air outlet in communication with the premixing chamber.

In some embodiments, the condensate water assembly includes: a condensate water drain pipe in communication with the combustion chamber; a flow guide structure disposed at a lower end of a gas chamber; and a condensate water collection portion at a position corresponding to the flow guide structure. The condensate water drain pipe is in communication with the combustion chamber through the condensate water collection portion.

The present disclosure further provides a computer-readable storage medium. The computer-readable storage medium stores a gas water heater control program. The gas water heater control program, when executed by a processor, implements the steps of the above-mentioned method for controlling the gas water heater.

In the method for controlling the gas water heater of the present disclosure, the current rotational speed of the air intake fan is acquired. The intake air pressure threshold corresponding to the water seal protection pressure threshold of the condensate water assembly is obtained by calculating based on the current rotational speed of the air intake fan. The air intake pressure value of the air intake fan is acquired. The gas water heater is controlled to stop operation, in response to determining based on the air intake pressure value and the intake air pressure threshold that the water seal of the condensate water assembly is at risk of being blown away. In the present disclosure, an air intake pressure of the gas water heater is acquired in real time by acquiring the air intake pressure, in such a manner that whether the water seal of the condensate water assembly is at risk of being blown away can be confirmed in a timely and effective manner. This solves a problem that harmful gases in an exhaust gas are discharged indoors and endanger safety of a user due to a sealing failure of the water seal caused when water in the water seal suddenly rises in response to a pressure and leads to a failure of the water seal, or when the water seal leaks and leads to an absence of a water column in the water seal. Thus, use safety of the gas water heater can be increased.

BRIEF DESCRIPTION OF THE DRAWINGS

To explain the embodiments of the present disclosure, drawings used in the description of the embodiments are briefly described below. The drawings as described below are merely some embodiments of the present disclosure.

FIG. 1 is a flowchart illustrating a method for controlling a gas water heater according to an embodiment of the present disclosure.

FIG. 2 is a flowchart illustrating another embodiment of a method for controlling a gas water heater of the present disclosure.

FIG. 3 is a flowchart illustrating yet another embodiment of a method for controlling a gas water heater of the present disclosure.

FIG. 4 is a flowchart illustrating still yet another embodiment of a method for controlling a gas water heater of the present disclosure.

Figures 5, 6:
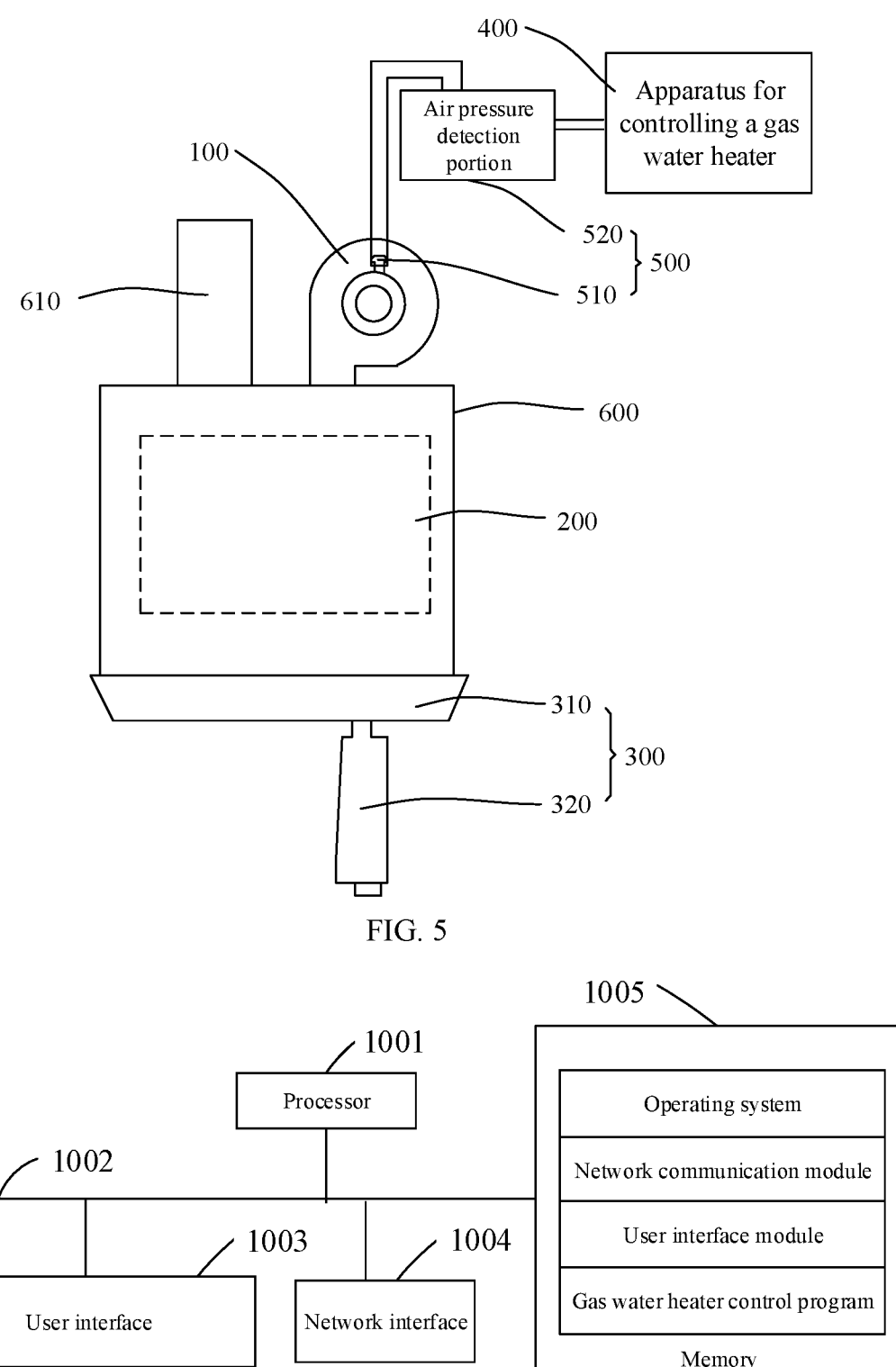
FIG. 5 is a schematic structural diagram of an embodiment of a gas water heater of the present disclosure.
FIG. 6 is a schematic diagram of a terminal configuration of a hardware operation environment of an apparatus for controlling a gas water heater involved in a solution according to an embodiment of the present disclosure.
Figure 7:
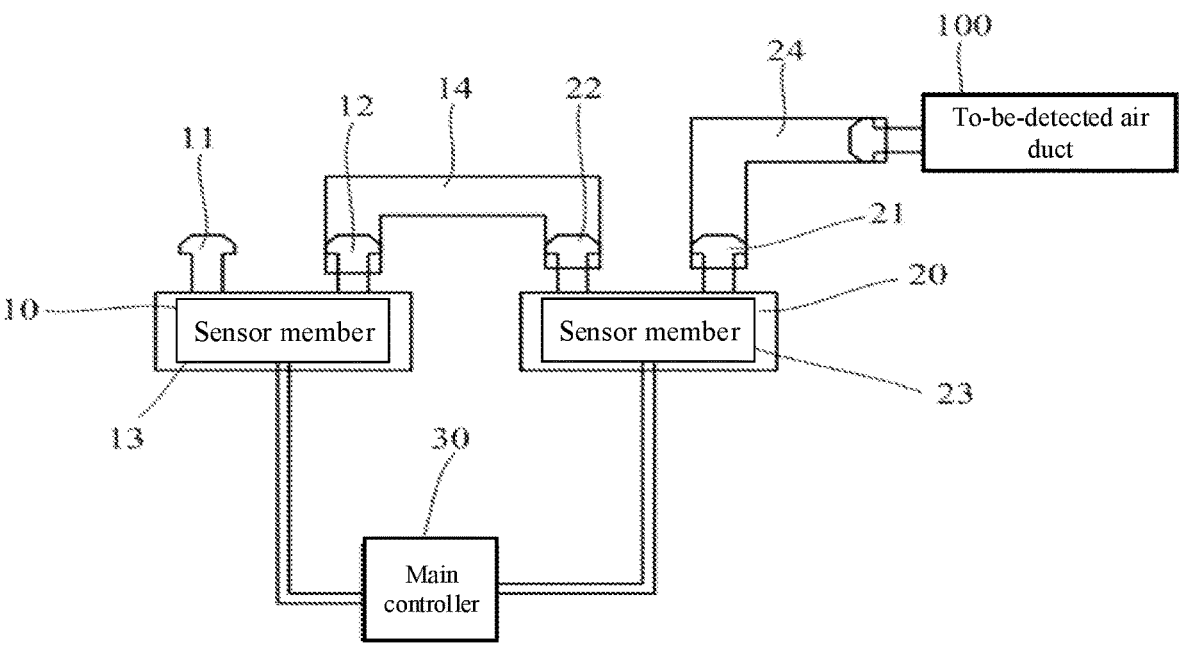
FIG. 7 is a schematic structural diagram of an embodiment of an air pressure detection device of the present disclosure.

Embodiments of the present disclosure will be further described in connection with reference to the accompanying drawings.

DETAILED DESCRIPTION OF THE DISCLOSURE

The embodiments of the present disclosure will be described clearly and completely below in combination with accompanying drawings of the embodiments of the present disclosure. The embodiments described below are only a part of the embodiments of the present disclosure, rather than all embodiments of the present disclosure.

The present disclosure provides a method for controlling a gas water heater.

In some embodiments, the gas water heater of the present disclosure may be a fully premixed gas water heater. A premixing chamber is formed in the fully premixed gas water heater. The gas water heater includes a combustor having a combustion chamber, an air intake fan configured to supply air to the combustion chamber, and a condensate water drainage assembly configured to receive and discharge condensate water in the combustion chamber and in communication with the combustion chamber. Meanwhile, the gas water heater further includes a heat exchanger, a gas pipe, and other components. When the gas water heater is in operation, the fan and a gas proportional valve convey air and a gas respectively to the premixing chamber. The gas water heater can be applied in a catalytic combustion gas water heater. The catalytic combustion gas water heater further includes a preheating combustor and a hot plate. Air and a gas are mixed well in the premixing chamber and then enter the combustor for preheating and combustion. Since a preheating plate already preheats a catalyst in the combustor, a fuel is ready for flameless catalytic combustion as soon as it enters the combustor. During the catalytic combustion, the catalyst can reduce a light-off temperature of the fuel and deepen an oxidation degree of the fuel, and an organic material undergoes flameless combustion at a low light-off temperature, is oxidized and decomposed into end products carbon dioxide and water, and releases a lot of heat. High temperature heat enters the water heater and exchanges heat with water in a water pipe to achieve a purpose of heating water in the heat exchanger. Finally, hot water in the heat exchanger is discharged from a water outlet pipe outside the gas water heater for a user to use. The gas water heater can also be applied in a high temperature air combustion gas water heater. The high temperature air combustion gas water heater includes a preheating combustor and a high temperature air combustor. Air and a gas are mixed well in the premixing chamber and then enter the preheating combustor for preheating and combustion. The preheating combustor heats a mixture of the air and gas to a target temperature and then conveys the mixture to a high temperature air combustion chamber. A jet assembly in the high temperature air combustor ejects a gas and air that are subject to high temperature air combustion with the heated air and gas, which can reduce the noise of the gas water heater, and allow the fuel to be fully burned to reduce an amount of produced harmful substances. High temperature heat generated by the high temperature air combustor exchanges heat with cold water in the heat exchanger to achieve a purpose of heating water in the heat exchanger. Finally, hot water in the heat exchanger is discharged from the water outlet pipe outside the gas water heater for the user to use.

The combustion chamber of the fully premixed gas water heater is airtight, and thus air needs to be blown to the combustion chamber by the fan during combustion. The fully premixed gas water heater uses an inverted combustion method. Water vapor and carbon dioxide produced by combustion is exhausted outdoors through a flue below. The combustion is of a high efficiency. However, water vapor in an exhaust gas (water+carbon dioxide+carbon monoxide+ nitrogen oxides) is condensed into water since a temperature of the water vapor is below 100 degrees. The condensate water requires inflow inversion, i.e., a water seal is required. The water seal is connected to the combustion chamber to prevent the exhaust gas generated by combustion from being discharged indoors through a pipeline of the water seal. Some water is usually stored in the water seal to ensure, based on a pressure generated by the water, that the exhaust gas will not be discharged indoors. However, once the gas water heater fails, such as when deflagration occurs in the machine or when the gas water heater is blocked, a gas in the combustion chamber expands rapidly, which causes a pressure in the combustion chamber to be increased instantaneously. Since the water seal and the combustion chamber are connected, a pressure at a water inlet of the water seal is the same as that in the combustor. In this case, the pressure will push a water column in the water seal to an outside, leading to a failure of the water seal. Carbon monoxide leaks into the user's room over time, resulting in a dangerous carbon monoxide poisoning incident.

As illustrated in FIG. 1, in an embodiment of the present disclosure, the method for controlling the gas water heater includes the following operations at blocks.

At block S100, an intake air pressure threshold is acquired.

In the embodiment, the intake air pressure threshold may be obtained through a current rotational speed of an air intake fan and by calculating, based on the current rotational speed of the air intake fan, the intake air pressure threshold corresponding to a water seal protection pressure threshold of a condensate water assembly. A cavity pressure in the gas water heater varies with a rotational speed of the air intake fan. In some embodiments, the cavity pressure in the gas water heater increases as the rotational speed of the air intake fan increases. On the contrary, the cavity pressure in the gas water heater decreases as the rotational speed of the air intake fan decreases. Also, a pressure value that the water seal of the condensate water assembly can withstand changes accordingly. In the embodiment, the water seal protection pressure threshold is set correspondingly based on a real-time rotational speed of the air intake fan. The water seal protection pressure threshold is a maximum pressure value that the water seal can withstand while ensuring that the water seal will not be blown away. The water seal protection pressure threshold may be obtained through tests. That is, the fan is controlled to operate at different rotational speeds, and a maximum pressure value that the water seal withstands when the water seal is kept from being blown away, i.e., the intake air pressure threshold, is recorded. Thus, a mapping relationship between rotational speeds of the air intake fan, water seal protection pressure thresholds, and intake air pressure thresholds is formed. In this way, during operation of the gas water heater, the current rotational speed of the air intake fan can be acquired in real time, and the intake air pressure threshold is obtained by calculating based on the acquired current rotational speed of the air intake fan. For example, suppose that the rotational speed of the fan is 7,200 rad/s, a corresponding air intake pressure value is 500 pa, and the water seal can withstand a pressure value of 430, the water seal protection pressure threshold corresponding to the water seal protection pressure threshold may be set to be smaller than 500 pa, e.g., any value from 480 pa to 500 pa.

At block S200, an air intake pressure value of the air intake fan is acquired.

In the embodiment, the air intake pressure value may be obtained by an air pressure detection device disposed in a pre-mixer. The air pressure detection device may obtain an air pressure in an air duct, i.e., the air intake pressure value. When the fan is stalled, or when a smoke exhaust opening of the gas water heater is blocked, or when the gas water heater is currently located in an area that experiences bad weather such as a typhoon, strong wind, or a hurricane, a pressure in the air duct changes. When the air blockage occurs in the air duct, all these factors will lead to a change of a pressure in the combustion chamber of the gas water heater. Due to an effect of the pressure, the water seal of the condensate water assembly also changes. For example, a level of the water seal drops. In addition, the water seal of the condensate water assembly may be blown away due to a reduction of the pressure in the combustion chamber. The pre-mixer, the combustion chamber, and the condensate water assembly of the gas water heater are in communication with each other. When the pressure in the combustion chamber of the gas water heater changes due to the above factors, the air intake pressure value changes accordingly. In the embodiment, the air intake pressure value may be used to determine whether the water seal of the condensate water assembly changes as the pressure in the combustion chamber changes. The air pressure detection device may be an air pressure switch or an air pressure sensor.

At block S300, the gas water heater is controlled to stop operation, in response to determining based on the air intake pressure value and the intake air pressure threshold that the water seal of the condensate water assembly is at risk of being blown away.

In the embodiment, different level points may be set for the water seal of the condensate water assembly. In particular, the different level points may be a minimum level point at which the water seal is blown away, and a level point at which the water seal is about to be blown away, i.e., a level point at which the water seal of the condensate water assembly is at risk of being blown away. When a change of the pressure in the combustion chamber of the gas water heater causes the water seal of condensate water assembly to drop below the minimum level point, it is determined that no water column presents in a water seal structure of the condensate water assembly, and the water seal can be determined to be abnormal. In this case, if the gas water heater continues operation, an air leakage occurs since the water seal fails. When the water seal is determined based on the air intake pressure value and the intake air pressure threshold to be lower than the level point at which the water seal is about to be blown away, the water seal of the condensate water assembly is determined to be at risk of being blown away. In this case, the gas water heater needs to be controlled to stop operation. Therefore, in the embodiment, when it is determined based on a pressure relation between the air intake pressure value, the intake air pressure threshold, and the water seal of the condensate water assembly that the water seal of the condensate water assembly is at risk of being blown away, an air inlet valve of the gas water heater is closed to control the gas water heater to stop the air intake operation. In this way, combustion can be stopped before the water seal is blown away, and the fan or the like can be controlled to stop operation to avoid the risk of the water seal being blown away and smoke leaking into a room, keeping gas safety for the user and helping increase use safety of the gas water heater.

With the method for controlling the gas water heater of the present disclosure, the current rotational speed of the air intake fan is acquired. The intake air pressure threshold corresponding to the water seal protection pressure threshold of the condensate water assembly is obtained by calculating based on the current rotational speed of the air intake fan. The air intake pressure value of the air intake fan is acquired. The gas water heater is controlled to stop operation, in response to determining based on the air intake pressure value and the intake air pressure threshold that the water seal of the condensate water assembly is at risk of being blown away. In the present disclosure, an air intake pressure of the gas water heater is acquired in real time by acquiring the air intake pressure, in such a manner that whether the water seal of the condensate water assembly is at risk of being blown away can be confirmed in a timely and effective manner. This solves a problem that harmful gases in the exhaust gas are discharged indoors and endanger safety of the user due to a sealing failure of the water seal caused when water in the water seal suddenly rises in response to a pressure and leads to a failure of the water seal, or when the water seal leaks and leads to an absence of the water column in the water seal. Thus, the use safety of the gas water heater can be increased.

In an embodiment, the intake air pressure threshold includes a water seal blown-away air pressure alert value and a water seal blown-away air pressure critical value smaller than the water seal blown-away air pressure alert value.

It should be noted that, due to changes in an ambient environment, the air intake pressure value in the gas water heater may change even when the rotational speed of the fan is constant. For example, when a wind speed in the ambient environment is slow, the pressure value fluctuates constantly in a small fluctuation range. Or, when the ambient environment is affected by bad weather such as a typhoon, strong wind, or a hurricane that causes an air pressure in the current ambient environment to be greater than a pressure value in the combustion chamber, a transient jump may occur, causing the water seal of the condensate water assembly to be blown away. Or, during use of the gas water heater, a problem of poor smoke exhaust may arise. For example, for users who live near the sea or live on the high floor, the gas water heater is often subject to bad weather (e.g., high winds), or the smoke exhaust pipe is often blocked by foreign objects, bringing problems such as poor smoke exhaust to the gas water heater. Since the condensate water assembly is connected to the combustor, a pressure of the condensate water and a pressure in the combustor are the same. When the deflagration occurs in the gas water heater, a transient effect of the deflagration easily leads to an instantaneous drop in an air pressure in a gas chamber. That is, the level of the water seal rises and then returns to normal or drops to a lower value. When a change happens in the pressure in the combustion chamber of the gas water heater, the change will lead to a drop in the water column in the water seal. Therefore, in the embodiment, the water seal blown-away air pressure alert value and the water seal blown-away air pressure critical value are set for the intake air pressure threshold. The water seal blown-away air pressure critical value is smaller than the water seal blown-away air pressure alert value. In addition, both the water seal blown-away air pressure alert value and the water seal blown-away air pressure critical value greater than the corresponding air intake pressure value when the water seal is blown away.

As illustrated in FIG. 2, in an embodiment, the operation of controlling, in response to determining based on the air intake pressure value and the intake air pressure threshold that the water seal of the condensate water assembly is at risk of being blown away, the air intake fan to stop the air intake operation includes the following operation at the block.

At block S310, when the air intake pressure value is smaller than the water seal blown-away air pressure alert value, the water seal of the condensate water assembly is determined to be at risk of being blown away, and a pre-mixer is controlled to stop operation.

In the embodiment, in response to detecting that the air intake pressure value is smaller than the water seal blown-away air pressure alert value, the combustion chamber of the combustor water heater may be determined to have a decreased current pressure. For example, in the event of air blockage, or in the event of blockage at the smoke exhaust opening due to poor smoke exhaust, or in the event of an increased air pressure in the ambient environment, the pressure in the combustion chamber decreases, causing the level of the water seal to drop.

As illustrated in FIG. 3, in an embodiment, the operation of acquiring the air intake pressure value of the air intake fan includes the following operation at the block.

At block S210, the air intake pressure values are acquired several times within a first predetermined duration.

The operation of controlling, in response to determining based on the air intake pressure value and the intake air pressure threshold that the water seal of the condensate water assembly is at risk of being blown away, the air intake fan to stop the air intake operation includes the following operations at blocks.

At block S320, the acquired air intake pressure values several times are averaged to obtain an average air pressure value within the first predetermined duration.

At block S330, when the average air pressure value within the first predetermined duration is greater than the water seal blown-away air pressure critical value and smaller than the water seal blown-away air pressure alert value, a pre-mixer is controlled to stop operation.

In the embodiment, a duration may be used as a sampling frequency. Air pressure values are continuously sampled for a period of time to acquire the air intake pressure values several times. The acquired air intake pressure values several times are averaged to acquire the average air pressure value within the first predetermined duration. It should be understood that the average air pressure value may be obtained through mean filtering at a level of several seconds. When the average air pressure value within the first predetermined duration is greater than the water seal blown-away air pressure alert value, it means that the pressure in the combustion chamber of the gas water heater is normal. In this case, the gas water heater may be controlled to operate with a current parameter. When the average air pressure value within the first predetermined duration is smaller than or equal to the water seal blown-away air pressure alert value, it means that the pressure in the combustion chamber of the gas water heater slowly decreases, or the pressure in the combustion chamber fluctuates between the water seal blown-away air pressure alert value and the water seal blown-away air pressure critical value. For example, when the smoke exhaust opening is slowly blocked, or when air in the ambient environment slowly increases from weak to strong, an air pressure value in an air duct changes slowly. In this case, the gas water heater can be controlled to stop operation.

As illustrated in FIG. 4, in an embodiment, the operation of acquiring the air intake pressure value of the air intake fan includes the following operation at the block.

At block S220, the air intake pressure values are acquired several times within a second predetermined duration.

The operation of determining, when the air intake pressure value is smaller than the water seal blown-away air pressure alert value, that the water seal of the condensate water assembly is at risk of being blown away, and controlling the pre-mixer to stop the air intake operation includes the following operation at the block.

At block S340, when a minimum air pressure value of the air pressure values within the second predetermined duration is smaller than the water seal blown-away air pressure critical value, the gas water heater is controlled to stop operation.

In the embodiment, a duration may be used as a sampling frequency. Air pressure values are continuously sampled for a period of time to acquire the air intake pressure values several times. When the minimum air pressure value of the air pressure values within the second predetermined duration is also greater than the water seal blown-away air pressure alert value, it means that the pressure in the combustion chamber of the gas water heater is normal. In this case, the gas water heater can be controlled to operate with a current parameter. When the minimum air pressure value of the air pressure values within the second predetermined duration is smaller than or equal to the water seal blown-away air pressure critical value, it means that the pressure in the combustion chamber of the gas water heater decreases rapidly and the air pressure value changes drastically. For example, when the smoke exhaust opening is blocked momentarily, or when a typhoon, a hurricane, or other strong wind weather comes, an air pressure value in the air duct changes rapidly, and an air pressure drops suddenly. In this case, the gas water heater can be controlled to stop operation.

It should be understood that in the above embodiments, the first predetermined duration is longer than the second predetermined duration. Obtaining the air pressure values several times within the second predetermined duration may be performed in synchronization with obtaining the air intake pressure values several times within the first predetermined duration. The air intake pressure values within the second predetermined duration are selected within the first predetermined duration to determine, based on the air intake pressure values within the second predetermined duration, whether there is a situation in which the minimum air pressure value is smaller than the water seal blown-away air pressure critical value.

In an embodiment, the operation of controlling, in response to determining based on the water seal blown-away threshold and the air intake pressure value that the water seal of the condensate water assembly is blown away, the pre-mixer to stop the air intake operation includes: controlling, in response to acquiring that a difference between two adjacent air intake pressure values is greater than a predetermined threshold, the pre-mixer to stop operation.

In the embodiment, when the ambient environment is affected by bad weather such as a typhoon, strong wind, or a hurricane that causes the air pressure in the current ambient environment to be greater than the pressure value in the combustion chamber, the transient jump may occur, causing the water seal of the condensate water assembly to be blown away. Or, during the use of the gas water heater, the problem of poor smoke exhaust may arise. For example, for users who live near the sea or live on the high floor, the gas water heater is often subject to bad weather (e.g., high winds), or the smoke exhaust pipe is often blocked by foreign objects, bringing problems such as poor smoke exhaust to the gas water heater. Since the condensate water assembly is connected to the combustor, the pressure of the condensate water and the pressure in the combustor are the same. During the use of the gas water heater, due to the blockage of the smoke exhaust pipe and an excessive pressure in the ambient environment, a transient effect of the air blockage presents, which easily leads to the instantaneous drop in the air pressure in the gas chamber. That is, the level of the water seal rises and then returns to normal or drops to the lower value. That is, when the change happens in the pressure in the combustion chamber of the gas water heater, the change will lead to the drop in the water column in the water seal. When the sampled air intake pressure values have a large difference, such as a difference ranging from 100 pa to 200 pa, it can be determined that the smoke exhaust pipe is blocked rapidly or an air inlet duct is blocked. Thus, the water seal is at risk of being blown away. In this case, the gas water heater may be controlled to stop operation.

In the above embodiments, when the ambient environment is affected by bad weather such as a typhoon, strong wind, or a hurricane, or when brief blockage occurs in a smoke pipe and causes a current air intake pressure value to be greater than a pressure value during normal combustion, a level of a water seal of a condensate water drain pipe is dropped. That is, the pressure in the combustion chamber decreases. In this case, a speed of the fan can be increased to counter the air pressure in the ambient environment. When the speed of the fan is increased, the level of the water seal slowly increases. When the level of the water seal is restored and maintained within a pressure value range for normal combustion by means of increasing the speed of the fan, it means that the pressure in the combustion chamber is normal and the gas in the gas water heater can combust normally. When the air blockage lasts for a short period of time, the speed of the fan may be increased to counter the air pressure in the ambient environment. Thus, the fan is in a non-conventional operation mode. When the pressure in the ambient environment is normal, the air intake pressure value can be detected by the air pressure sensor to return to a normal range. Or, when the pressure in the ambient environment fluctuates slightly, the rotational speed of the fan may be slowed down to make the fan return to a rotational speed in a conventional operation mode, ensuring that an air volume provided by the fan to the combustion chamber can guarantee that combustion can be carried out in the combustion chamber of the machine in accordance with a predetermined value of pressure. A range for increasing the speed of the fan is limited. Also, the pressure value of the water seal is limited. When the pressure value reaches a value, the water seal will still be blown away. A detection on the air intake air pressure value can reflect a degree of blockage of the smoke pipe and an intensity of air blowing. In the embodiment, when the air pressure is smaller than a value and causes the water seal to be at risk of being blown away, the machine is shut down early. In some embodiments, an alarm circuit, e.g., an audible and visual alarm circuit, may be set to release an early alarm when the water seal is at risk of being blown away.

The present disclosure further provides an apparatus for controlling a gas water heater. The apparatus for controlling the gas water heater includes: a processor; a memory; and a gas water heater control program stored on the memory and executable on the processor. The gas water heater control program, when executed by the processor, implements the blocks of the above-mentioned method for controlling the gas water heater.

The processor may be a microprocessor such as a Central Processing Unit (CPU), a Microcontroller Unit (MCU), a single-chip microcomputer, a Digital Signal Processor (DSP), a Field Programmable Gate Array (FPGA), etc. The microprocessor, as a control center of the gas water heater, connects individual parts of the entire gas water heater using various interfaces and lines, and performs various functions of the gas water heater and processes data by running or executing a software application and/or module stored in a memory and by calling data stored in the memory, to monitor the gas water heater as a whole. The microprocessor may include one or more processing units. The microprocessor may integrate an application processor and a modem processor. The application processor primarily handles an operating system, a user interface, applications, etc. The modem processor primarily handles wireless communications. It should be understood that the above modem processor may also not be integrated into the processor.

FIG. 6 is a schematic diagram of a terminal configuration of a hardware operation environment of an apparatus for controlling a gas water heater involved in a solution according to an embodiment of the present disclosure.

The terminal according to the embodiments of the present disclosure may be a Personal Computer (PC), or a movable terminal device having a display function such as a smartphone, a tablet computer, an e-book reader, a Moving Picture Experts Group Audio Layer IV (MP4) player, and a portable computer. As illustrated in FIG. 1, the terminal may include a processor 1001 (e.g., a CPU), a communication bus 1002, a user interface 1003, a network interface 1004, and a memory 1005. The communication bus 1002 is configured to implement connection communication between these components. The user interface 1003 may include a display screen, and an input unit such as a keyboard. In some embodiments, the network interface 1004 may include a standard wired interface and a standard wireless interface (e.g., a WI-FI interface). The memory 1005 may be a high-speed Random Access Memory (RAM) or a non-volatile memory such as a disk memory. In some embodiments, the memory 1005 may also be a storage device independent of the above-mentioned processor 1001.

The structure of the terminal of the hardware operation environment of the apparatus for controlling the gas water heater illustrated in FIG. 1 does not constitute a limitation of the apparatus for controlling the gas water heater. The apparatus for controlling the gas water heater may include more or fewer components than those illustrated in the figure, or combine certain components, or have a different arrangement of components.

The present disclosure further provides a gas water heater provided with a cold-water inlet pipe and a hot-water outlet pipe. As illustrated in FIG. 5, the gas water heater includes a pre-mixer 100, a combustor 200, a condensate water assembly 300, and the apparatus 400 for controlling the gas water heater as mentioned above.

The pre-mixer 100 includes a premixing chamber and an air intake fan disposed in the premixing chamber.

The combustor 200 has a combustion chamber and is in communication with the premixing chamber.

The condensate water assembly 300 is in communication with the combustion chamber.

The apparatus 400 for controlling the gas water heater is configured to control, in response to determining based on the intake air pressure threshold and the air intake pressure value of the pre-mixer 100 that the water seal of the condensate water assembly 300 is about to be blown away, the pre-mixer 100 to stop operation.

In the embodiment, a pre-mixer housing of the pre-mixer 100 has a gas inlet, an air inlet, and a mixture outlet. The premixing chamber is defined in the pre-mixer housing. The combustor 200 is disposed above or below the pre-mixer housing. The combustor 200 is in communication with the premixing chamber. The combustor 200 may be a catalytic combustor 200 or a high temperature air combustor 200. The heat exchanger is disposed at a side of the combustor 200 facing away from the pre-mixer 100, and is accommodated in the housing 600 of the combustor 200 to absorb heat generated by combustion in the combustor 200. The heat exchanger has a water inlet and a water outlet. The water inlet is in communication with the cold-water inlet pipe. The water outlet is in communication with the hot-water outlet pipe. The gas water heater is further provided with a gas pipe and the gas proportional valve disposed on the gas pipe. When the combustor 200 is in operation, the fan and the gas proportional valve operate to convey the air and gas respectively to the premixing chamber. The air and gas are mixed well in the premixing chamber, and then enter the combustor 200 located below the premixing chamber to be combusted. The water in the heat exchanger may absorb heat generated by the combustor 200 to produce hot water for the user to use. For example, a large amount of heat generated by the combustor 200 may exchange heat with a surface of the heat exchanger to achieve the purpose of heating the water in the heat exchanger. Water pipes for circulating water may be provided in the heat exchanger. A water inlet pipe and a water outlet pipe that are in communication with the water pipes are disposed on an exterior of the heat exchanger. The system may inject cold water into the water pipes of the heat exchanger through the water inlet pipe (not illustrated).

Combustion of the fuel in the combustor 200 produces high-temperature smoke. The high-temperature smoke enters the heat exchanger and exchanges heat with the water in the water pipes to achieve the purpose of heating the water in the heat exchanger. Finally, the hot water in the heat exchanger is discharged from the water outlet pipe (not illustrated) outside the gas water heater for the user to use.

As illustrated in FIG. 5, in an embodiment, the pre-mixer 100 includes: an air inlet; a gas inlet; and a venturi tube. A first air intake inlet of the venturi tube is in communication with the air inlet, a second air intake inlet of the venturi tube is in communication with the gas inlet, and an air outlet of the venturi tube is in communication with the premixing chamber.

In the embodiment, the combustor 200 may further be provided with a gas inlet pipe. The venturi tube is located between an air intake inlet and an air outlet of the air duct. An inner wall the venturi tube and an inner wall of the air duct together form a gas distribution cavity in communication with the gas inlet pipe. Air may enter the venturi tube from the air intake inlet of the air duct and form an air vortex at the air outlet of the venturi tube. The air vortex may entrain a gas ejected by an annular orifice to fully mix the gas with the air in the air duct. Such a fully mixed mixture of the gas and air can be adequately combusted in the gas water heater, which can improve a combustion efficiency, and reduce an amount of produced harmful substances such as nitrogen oxides (NOx) and carbon monoxide.

As illustrated in FIG. 5, in an embodiment, the gas water heater further includes an air pressure detection device 500. A pressure measurement hole of the air pressure detection device 500 is formed in the pre-mixer 100. The air pressure detection device 500 is configured to detect an air pressure value in the pre-mixer 100.

In the embodiment, the air pressure detection device 500 includes a pressure measurement portion 510 and an air pressure detection portion 520. The air pressure detection portion 520 may be implemented as a pressure sensor or an air pressure switch. The pressure measurement portion 510 may be implemented as a pressure measurement hole. The pressure measurement portion 510 may be in communication with the air pressure detection portion 520 through an air pipe or a pressure measurement pipe. In practice, the pressure measurement hole of the air pressure detection device 500 may be formed on the venturi tube to detect an air pressure in the air duct in time, determining whether air blockage occurs in the air duct, or whether the smoke exhaust pipe is blocked, or whether an air intake air pressure value in the air duct changes due to factors such as strong wind in the ambient environment. For example, when the fan is stalled or the air blockage occurs in the air duct, the pressure in the air duct changes. The air intake air pressure value in the air duct may be obtained in time by the air pressure detection device 500 to determine whether the air blockage occurs in the air duct. When a level sensor such as a capacitive-type or electrode-type level sensor is adopted to obtain the level of the water seal of the condensate water assembly 300, an erroneous determination may be easily made when water flows across a surface of an electrode, leading to a risk of undesired shutdown. When a mechanical float level switch is adopted, the water seal has a complicated and mechanical design, which leads to a high risk of a float getting stuck. Compared with the level sensor and the mechanical float level switch, the air pressure detection device 500 according to the embodiment can obtain the air intake air pressure value in the air duct in a timely manner to determine whether the water seal is at risk of being blown away, which can improve reliability of the gas water heater.

In the embodiment, the gas water heater may further be provided with a flowmeter. The flowmeter can be configured to detect a water flow in real time. When no water flow is detected, i.e., in the absence of water, the gas water heater is in a non-operation state. When the water flow is detected, the gas water heater needs to be ignited or is already in a fire state, and the fan is in operation. An air intake pressure value of the air pressure switch or the air pressure sensor is collected. That is, an air pressure value U average air pressure value (an average air pressure value obtained by averaging, within the first predetermined duration, the air intake pressure values acquired several times) and a U sudden change air pressure value (air pressure values of the pre-mixer 100 are acquired several times during the second predetermined duration) are collected. An air pressure value U water seal blown-away value at which the weal seal is blown away when the smoke pipe is blocked is calculated based on a currently-monitored rotational speed of the fan, i.e., the intake air pressure threshold corresponding to the water seal protection pressure threshold of the condensate water assembly 300. There are two states of the water seal being blown away, one is an occurrence of slow blockage, in which state the air pressure value changes slowly; the other is instantaneous blockage, in which state the air pressure value changes drastically. A U sudden change air pressure filtering value is a minimum value within a short period of time. A U average air pressure is mean filtering at an n-second level. When the current air pressure value U average air pressure being smaller than the water seal blown-away air pressure alert value (U water seal blown-away) and being greater than the water seal blown-away air pressure critical value (U water seal blown-away −20 pa) lasts for T long seconds, the smoke pipe is considered to be blocked slowly and the water seal is at risk of being blown away. When the air pressure or the U sudden change air pressure being smaller than the water seal blown-away air pressure critical value (U water seal blown-away −20 pa) lasts for T short seconds, the smoke pipe is considered to be blocked rapidly and the water seal is at risk of being blown away. When the smoke pipe is considered to be blocked, combustion is stopped, a safety gas valve is closed, and rear-clearing is activated. After the fault is cleared and the gas water heater is restarted, the air intake air pressure value is re-detected in real time to control the gas water heater.

As illustrated in FIG. 5, in an embodiment, the gas water heater further includes the housing 600.

The combustor is disposed in the housing 600. A smoke exhaust pipe 610 is disposed on the housing 600. Different combustion chambers may be formed by the housing 600 in accordance with types of the gas water heater, e.g., a preheating combustion chamber, a secondary combustion chamber, etc.

In the embodiment, the heat exchanger of the gas water heater is also assembled into the housing 600. A flow guide structure may further be disposed on the housing 600. The condensate water assembly 300 is connected to the housing 600 through the flow guide structure disposed at a lower end of the housing 600. When water vapor in the housing 600 meets with a side wall of the housing 600 having a temperature smaller than a particular temperature, condensate water is generated, and flows into the condensate water assembly 300 through the flow guide structure. Thus, the collection of the condensate water is achieved. Smoke generated during the combustion is discharged through the smoke exhaust pipe 610.

In an embodiment, the condensate water assembly 300 includes the flow guide structure disposed at a lower end of the gas chamber and a condensate water collection portion 310 at a position corresponding to the flow guide structure. The condensate water collection portion 310 is in communication with a condensate water outlet and the gas chamber through the condensate water assembly 300. When water vapor in the combustion chamber meets with a side wall of the combustion chamber having a temperature smaller than a particular temperature, condensate water is generated, and flows into the condensate water collection portion 310 through the flow guide structure, e.g., a condensate water receiving tray. As the condensate water continues to be injected into the condensate water collection portion 310, a level of the condensate water gradually rises, and the condensate water flows out through the water seal structure and a condensate water drain pipe 320. The condensate water assembly 300 further includes the condensate water drain pipe 320. The condensate water drain pipe 320 has one end in communication with the condensate water collection portion 310 and the other end in communication with a water outlet end. The condensate water is well sealed during normal combustion. To prevent smoke from being exhausted along the condensate water drain pipe 320, the water seal structure is formed between the condensate water drain pipe 320 and the combustion chamber, or formed on the condensate water drain pipe 320. The water seal structure has a low-lying portion to hold water to form water sealing. The low-lying portion may be a segment of pipe having a diameter smaller than that of the condensate water drain pipe 320, a circle-shaped pipe formed by bending and twisting a segment of the condensate water drain pipe 320, or a U-shaped pipe formed through bending and twisting. The condensate water drain pipe 320 may be made of a material such as a silicone pipe.

As illustrated in FIG. 5, in an embodiment, the gas water heater further includes the heat exchanger (not illustrated).

The heat exchanger (not illustrated) is disposed in the housing 600. One end of the heat exchanger is in communication with the cold-water inlet pipe. The other end of the heat exchanger is in communication with the hot-water outlet pipe. The heat exchanger is configured to absorb heat generated by combustion in a first combustion chamber 20 and a second combustion chamber 30 of the combustor, and exchange the absorbed heat with the water in the heat exchanger.

In the embodiment, the cold-water inlet pipe is configured to introduce cold water to the gas water heater from the ambient environment, and feed the cold water to the heat exchanger. The heat exchanger is configured to absorb the heat generated by the combustion in the combustor to heat the cold water into hot water. The hot water is guided out of the gas water heater through the hot-water outlet pipe. The water inlet of the heat exchanger may be connected to municipal tap water to introduce the cold water.

The present disclosure further provides a computer-readable storage medium. The computer-readable storage medium stores a gas water heater control program. The gas water heater control program, when executed by a processor, implements the blocks of the above-mentioned method for controlling the gas water heater.

The present disclosure further provides an air pressure detection device applicable in an electrical appliance having a fan, such as a gas water heater, a range hood, an air conditioner, etc. As an example, the following embodiments describe that the air pressure detection device is applied in the gas water heater.

In the electrical appliance having the fan such as the gas water heater, to obtain the rotational speed of the fan or a pressure in an air duct where the fan is located, e.g., in the gas water heater, the air pressure switch, the air pressure sensor, or a fan current is usually used to determine an air blockage condition to avoid incidents such as deflagration in combustion. However, normally a single air pressure switch or a single air pressure sensor is used to detect the air pressure in the air duct, or a single current sampling resistor is used to detect a winding current to obtain the rotational speed of the fan. However, in the event of a current sampling failure, a failure of the air pressure switch, or a failure of the air pressure sensor, once detection is impossible or a false determination is made when the air blockage occurs in the air duct, the deflagration is likely to occur in the water heater under double faults, undermining the use safety of the gas water heater.

To solve the above problems, as illustrated in FIG. 7 to FIG. 10, the present disclosure provides an air pressure detection device including two air pressure detectors to increase the safety of the gas water heater. In an embodiment of the present disclosure, the air pressure detection device includes a first air pressure detector 10, a second air pressure detector 20, and a main controller 30.

Each of the first air pressure detector 10 and the second air pressure detector 20 has a first pressure measurement hole and a second pressure measurement hole.

A first pressure measurement hole 11 of the first air pressure detector 10 is configured for communication with an atmospheric pressure. A first pressure measurement hole 21 of the second air pressure detector 20 is configured for communication with a to-be-detected air duct 100.

A second pressure measurement hole 12 of the first air pressure detector 10 and a second pressure measurement hole 22 of the second air pressure detector 20 are in communication with each other.

The main controller 30 is connected to a detection output terminal of the first air pressure detector 10 and a detection output terminal of the second air pressure detector 20. The main controller 30 is configured to output a detection result based on a detection signal from the first air pressure detector 10 and a detection signal from the second air pressure detector 20.

In the embodiment, a housing is disposed on each of the first air pressure detector 10 and the second air pressure detector 20. A cavity is formed in the housing. A sensor portion to detect a pressure is further disposed on each of the first air pressure detector 10 and the second air pressure detector 20 to realize a pressure detection, and output, based on a detected pressure value, an on/off signal or an analog voltage value corresponding to a magnitude of the detected pressure value, to enable the main controller 30 to determine, based on the received on/off signal or based on the analog voltage value set in proportion (proportional or inversely proportional) to the pressure value, whether the air blockage occurs in the to-be-detected air duct 100 or whether the first air pressure detector 10 and the second air pressure detector 20 themselves fail. Each of the first air pressure detector 10 and the second air pressure detector 20 has two pressure measurement holes, i.e., the first pressure measurement hole and the second pressure measurement hole. The second pressure measurement hole 12 of the first air pressure detector 10 and the second pressure measurement hole 22 of the second air pressure detector 20 may be in communication with each other through an air pipe 14 or the pressure measurement pipe. Or, a pressure measurement opening is formed on the housing of the first air pressure detector 10 and/or the second air pressure detector 20. The second pressure measurement hole 12 of the first air pressure detector 10 is in communication with the second air pressure detector 20 through the pressure measurement opening formed on the housing of the second air pressure detector 20. The second pressure measurement hole 22 of the second air pressure detector 20 is in communication with the first air pressure detector 20 through the pressure measurement opening formed on the housing of the first air pressure detector 10. The first pressure measurement hole 11 of the first air pressure detector 10 is configured to collect the atmospheric pressure. In some embodiments, in a case where the air pressure detection device is mounted in a housing of the electrical appliance such as the gas water heater, the range hood, the air conditioner, etc., a pressure measurement opening is formed on the housing of the electrical appliance. The first pressure measurement hole 11 of the first air pressure detector 10 is in communication with the pressure measurement opening formed on the housing of the electrical appliance, or the first pressure measurement hole 11 of the first air pressure detector 10 extends outside the housing to detect an atmospheric pressure of an environment where the electrical appliance is located. The first pressure measurement hole 21 of the second air pressure detector 20 is in communication with the to-be-detected air duct 100. For example, in the gas water heater, at least one combustion chamber is formed in the housing of the gas water heater. The gas water heater further includes an air intake pipe. An air duct is formed between the air intake pipe and an air intake inlet of the combustion chamber. The fan is disposed in the air duct formed by the air intake pipe and the combustion chamber. Under operation of the fan, air is drawn to the combustion chamber to provide the combustor in the combustion chamber with air required for combustion. In some embodiments, the first pressure measurement hole 21 of the second air pressure detector 20 may be disposed on the fan, or on the air intake pipe, or in communication with the to-be-detected air duct 100 through an air pipe 24, to collect an air pressure in the air duct.

The main controller 30 may be implemented as any one of microprocessors such as an FPGA, a single-chip microcomputer, a DSP, etc. By integrating some hardware circuits and software applications or algorithms in the main controller 3010, implement filtering and A/D conversion and other processing on signals, which, e.g., can be implemented through integration of a hardware circuit such as an A/D converter and a filter, or can be analyzed and compared to receive analog voltage quantities, etc. The main controller 30, which may be a control center of the electrical appliance, connects individual parts of the entire electrical appliance using various interfaces and lines, and completes an output of a corresponding detection result and performs corresponding control by running or executing a software application and/or module stored in a memory of the main controller 30, by calling data stored in the memory, and by performing comparison and analysis and other processing on the received on/off signals or analog voltage values using a software algorithm program and/or a hardware circuit module integrated in the main controller 30, to monitor the electrical appliance as a whole. For example, the main controller 30 can be configured to obtain an air pressure value of the to-be-detected air duct through the first air pressure detector 10 and the second air pressure detector 20, compare a current air pressure value with a predetermined air pressure value to obtain an air pressure value comparison result, and adjust the rotational speed of the fan based on the air pressure value comparison result to keep a current value in the to-be-detected air duct to be consistent with the predetermined air pressure value. It should be understood that, when the fan is subjected to an air pressure resistance from the ambient environment, the rotational speed of the fan is affected, resulting in a change of the air pressure value in the to-be-detected air duct. Therefore, a change of the air pressure resistance from the ambient environment can also be determined through detecting, using the first air pressure detector 10, the atmospheric pressure. Disposing the first air pressure detector 10 and the second air pressure detector 20 in the combustor allows the combustor to determine the air pressure resistance from the ambient environment and the air pressure value of the to-be-detected air duct based on the first air pressure detector 10 and the second air pressure detector 20. When a change of the air pressure value is detected, the rotational speed of the fan 20 is changed to change the air pressure value in the to-be-detected air duct, until the current air pressure value is kept consistent with the predetermined air pressure value. The first air pressure detector 10 and the second air pressure detector 20 can be configured to detect the change of an air pressure in the to-be-detected air duct 100 to determine a magnitude of the air pressure resistance from the ambient environment. Thus, a corresponding adjustment can be made to the rotational speed of the fan to resist the air pressure resistance from the ambient environment, ensuring fluidity of an airflow in the to-be-detected air duct 100 to enable normal and stable combustion in the water heater.

In the embodiments of the present disclosure, the second pressure measurement hole 12 of the first air pressure detector 10 and the second pressure measurement hole 22 of the second air pressure detector 20 are in communication with each other, which is equivalent to that the second pressure measurement hole 12 of the first air pressure detector 10 and the second pressure measurement hole 22 of the second air pressure detector 20 are connected in series. In this case, the first air pressure detector 10 can be configured to detect an air pressure of each of the first pressure measurement hole and the second pressure measurement hole, i.e., an air pressure from the atmospheric pressure to a common point between the second pressure measurement hole 12 of the first air pressure detector 10 and the second pressure measurement hole 22 of the second air pressure detector 20. The second air pressure detector 20 can be configured to detect an air pressure of each of the first pressure measurement hole and the second pressure measurement hole, i.e., an air pressure from the to-be-detected air duct 100 to the common point between the second pressure measurement hole 12 of the first air pressure detector 10 and the second pressure measurement hole 22 of the second air pressure detector 20. The two air pressure detectors connected in series can enable a distribution of the air pressure values in the to-be-detected air duct 100, i.e., achieve a pressure division in a series connection. With the two air pressure detectors, accuracy of an air pressure detection result of the to-be-detected air duct 100 can be improved to avoid an inability to accurately detect the air pressure of the to-be-detected air duct 100 when the air pressure detector is faulty, enable reliable operation under double faults, and realize a reliable detection of the air pressure value to avoid the deflagration of the gas water heater. The main controller 30 can further be configured to determine, based on the detection result, whether the first air pressure detector 10 or the second air pressure detector 20 has a fault of its own, identify a fault of the air pressure sensor to realize a self-examination of the first air pressure detector 10 or the second air pressure detector 20, achieving double protection of the gas water heater. The present disclosure is conducive to increasing the safety of the gas water heater.

Further, in the above embodiments, a detection range of the first air pressure detector 10 and a detection range of the second air pressure detector 20 may be set to be the same, in such a manner that the main controller 30 can be configured to determine, based on the detection result of the first air pressure detector 10 and the second air pressure detector 20, whether the air blockage occurs in the to-be-detected air duct 100, and perform a self-examination on each of the first air pressure detector 10 and the second air pressure detector 20. By setting structures, air pressure sensors, or the like of the first air pressure detector 10 and the second air pressure detector 20 to be the same, the detection ranges of the first air pressure detector 10 and the second air pressure detector 20 can be set to be the same to achieve an equal division of the air pressure value in the to-be-detected air duct 100. Thus, a range of the air pressure detection device can be expanded, i.e., doubled, compared with a range when one air pressure detector is set, which is conducive to expanding an applicable scope of the air pressure detection device.

Figure 8:
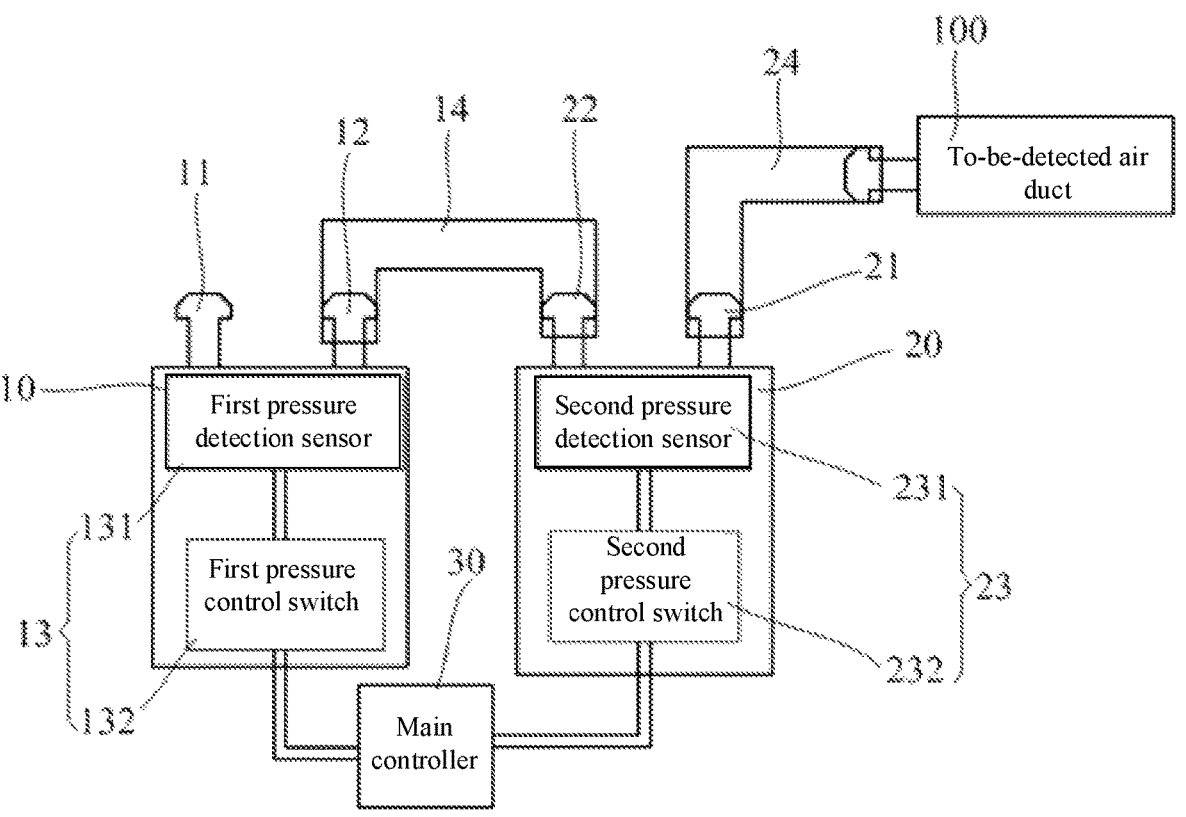
FIG. 8 is a schematic structural diagram of another embodiment of an air pressure detection device of the present disclosure.
Figure 9:
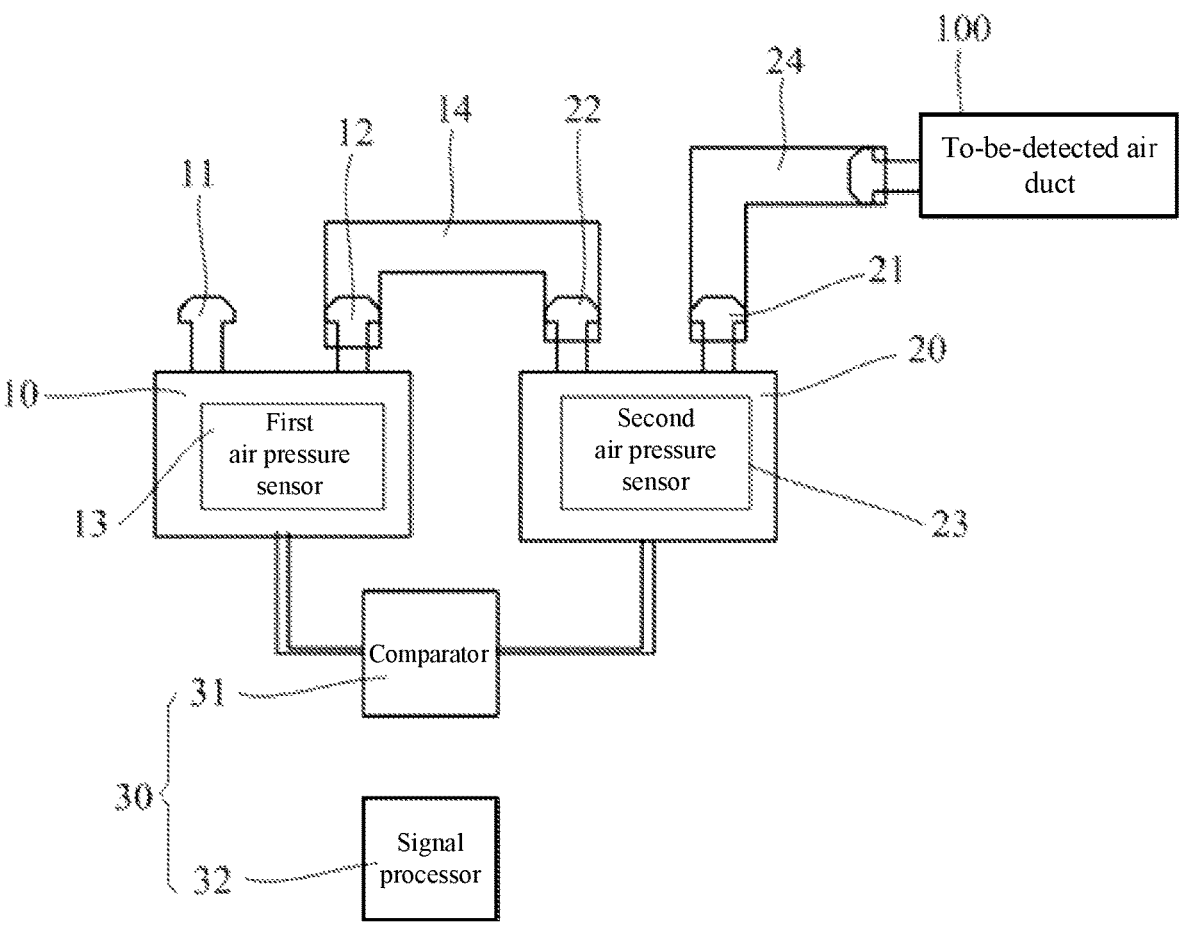
FIG. 9 is a schematic structural diagram of yet another embodiment of an air pressure detection device of the present disclosure.

As illustrated in FIG. 8 and FIG. 9, it should be understood that, a sensor member 13 in the first air pressure detector 10 and a sensor member 23 in the second air pressure detector 20 can both be implemented as a pressure switch or a pressure sensor. As illustrated in FIG. 8, when both the sensor member 13 and the sensor member 23 are implemented as the pressure switch, the first air pressure detector 10 includes a first air pressure switch, and the second air pressure detector 20 includes a second air pressure switch.

In some embodiments, the first air pressure switch includes a first pressure detection sensor 131 and a first pressure control switch 132. The first pressure control switch 132 is configured to connect in series to a power supply circuit.

The first pressure detection sensor 131 is configured to detect a pressure difference between the first pressure measurement hole 11 of the first air pressure detector 10 and the second pressure measurement hole of the first air pressure detector 10 to generate a first air pressure detection signal, and control on/off of the first pressure control switch 132 based on the first air pressure detection signal.

The second air pressure switch includes a second pressure detection sensor 231 and a second pressure control switch 232. The second pressure control switch 232 is configured to be disposed in and connect in series to a power supply circuit of an air supply assembly.

The second pressure detection sensor 231 is configured to detect a pressure difference between the first pressure measurement hole 21 of the second air pressure detector 20 and the second pressure measurement hole of the second air pressure detector 20 to generate a second air pressure detection signal, and control on/off of the second pressure control switch 232 based on the second air pressure detection signal.

In the embodiment, each of the first air pressure switch and the second air pressure switch may be implemented using two parts, a pressure detection sensor and a pressure control switch. The pressure detection sensor of the first air pressure switch is configured to detect a pressure in a cavity of a first pressure detector, and control the on/off of the first pressure control switch 132 based on the detected pressure. The pressure detection sensor of the second air pressure switch is configured to detect a pressure in a cavity of a second pressure detector, and control the on/off of the second pressure control switch 232 based on the detected pressure. The first pressure detection sensor 131 of the first pressure switch may be mounted in a cavity formed by a housing of the first pressure detector to detect a pressure in the cavity, i.e., the air pressure from the atmospheric pressure to the common point between the second pressure measurement hole 12 of the first air pressure detector 10 and the second pressure measurement hole 22 of the second air pressure detector 20. The second pressure detection sensor 231 of the second pressure switch may be mounted in a cavity formed by a housing of the second pressure detector to detect a pressure in the cavity, i.e., the air pressure from the to-be-detected air duct 100 to the common point between the second pressure measurement hole 12 of the first air pressure detector 10 and the second pressure measurement hole 22 of the second air pressure detector 20. The first pressure control switch 132 and the second pressure control switch 232 may each be connected in series to a power supply circuit of the fan simultaneously to control on/off of the power supply circuit of the fan. The pressure control switch can be configured to be switched off when the pressure detection sensor detects that the pressure in the to-be-detected air duct 100 is greater than a predetermined pressure protection threshold, and switched on when the pressure detection sensor detects that the pressure in the to-be-detected air duct 100 is smaller than a predetermined reset threshold. In this way, the fan can be controlled to stop in time to avoid damages to the fan in case of air blockage in the air duct. A detection terminal of the main controller 30 may be connected to the power supply circuit. Or, the first pressure control switch 132 and the second pressure control switch 232 each are connected in series to a different power supply circuit. For example, a direct current power supply is disposed in the electrical appliance. Each of the first pressure control switch 132 and the second pressure control switch 232 is connected in series between the direct current power supply and ground. The on/off of the first pressure control switch 132 and the second pressure control switch 232 are controlled to generate high-level and low-level signals. For example, the main controller 30 can be configured to receive two high-level detection signals when the first pressure control switch 132 and the second pressure control switch 232 are switched on simultaneously. The main controller 30 can be configured to receive one high-level detection signal and one low-level detection signal when either of the first pressure control switch 132 and the second pressure control switch 232 is switched off. The main controller 30 can be configured to receive two low-level detection signals when the first pressure control switch 132 and the second pressure control switch 232 are switched off simultaneously. The main controller 30 can be configured to determine, based on the received high-level and/or low-level detection signals, whether the air blockage occurs in the to-be-detected air duct 100 using the detection result of the first air pressure detector 10 and the second air pressure detector 20, and determine, based on the detection result, whether the first air pressure detector 10 or the second air pressure detector 20 has a fault to realize the self-examination of the first air pressure detector 10 or the second air pressure detector 20. In some embodiments, the main controller 30 is configured to determine, in response to detecting that the first pressure control switch 132 and/or the second pressure control switch 232 is switched off, that the air blockage occurs in the to-be-detected air duct 100, or that the first pressure control switch 132 and/or the second pressure control switch 232 is faulty, in which case the gas water heater can be controlled to stop operation; and determine, based on that the first pressure control switch 132 and the second pressure control switch 232 are switched on, that the air pressure of the to-be-detected air duct 100 is normal, in which case the gas water heater is controlled to start or continue to operate.

As illustrated in FIG. 9, when both the first air pressure detector 10 and the second air pressure detector 20 are implemented as pressure switches, the first air pressure detector 10 includes an air pressure sensor, i.e., a first air pressure sensor 13, and the second air pressure detector 20 includes an air pressure sensor, i.e., a second air pressure sensor 23.

In the embodiment, the air pressure sensor of the first air pressure detector 10 can be configured to detect the air pressure of each of the first pressure measurement hole and the second pressure measurement hole, i.e., the air pressure from the atmospheric pressure to the common point between the second pressure measurement hole 12 of the first air pressure detector 10 and the second pressure measurement hole 22 of the second air pressure detector 20. The air pressure sensor of the second air pressure detector 20 can be configured to detect the air pressure of each of the first pressure measurement hole and the second pressure measurement hole, i.e., the air pressure from the to-be-detected air duct 100 to the common point between the second pressure measurement hole 12 of the first air pressure detector 10 and the second pressure measurement hole 22 of the second air pressure detector 20. The two air pressure sensors connected in series can enable the distribution of the air pressure values in the to-be-detected air duct 100, i.e., achieve a pressure division in a series connection. Each of the two air pressure sensors is configured to convert a detected air pressure value into a corresponding analog voltage value, and output the corresponding analog voltage value to the main controller 30. The main controller 30 can be configured to determine, based on the analog voltage values outputted from the two air pressure sensors, whether the air blockage occurs in the to-be-detected air duct 100, and further determine, based on the detection result, whether the first air pressure detector 10 or the second air pressure detector 20 has a fault of its own, to realize the self-examination of the first air pressure detector 10 or the second air pressure detector 20.

In some embodiments, the main controller 30 includes a comparator 31 and a signal processor 32.

The comparator 31 has two input terminals connected to the first air pressure detector 10 and the second air pressure detector 20 respectively. The comparator 31 is configured to compare an air pressure value outputted from the first air pressure detector 10 with an air pressure value outputted from the second air pressure detector 20.

The signal processor 32 is connected to an output terminal of the comparator 31. The signal processor 32 is configured to control, in response to determining based on the comparator 31 that the air pressure value outputted from the first air pressure detector 10 is equal to the air pressure value outputted from the second air pressure detector 20 and determining that the air supply assembly has a fault, the gas water heater to stop operation; and control, in response to determining based on the comparator 31 that the air pressure value outputted from the first air pressure detector 10 is unequal to the air pressure value outputted from the second air pressure detector 20, the gas water heater to stop operation.

In the embodiment, the signal processor 32 is configured to determine, in response to determining based on a result of comparison from the comparator 31 that the analog voltage values outputted from the two air pressure sensors are equal or having a difference falling within an acceptable error range, that normal operation can be performed. In this case, the gas water heater is controlled to start or continue to operate. The signal processor 32 is configured to determine, in response to determining based on the result of the comparison from the comparator 31 that the analog voltage values outputted from the two air pressure sensors are unequal or having a difference exceeding the acceptable error range, that the air blockage occurs in the to-be-detected air duct 100 or that the first pressure control switch 132 and/or the second pressure control switch 232 has a fault. In this case, the gas water heater can be controlled to stop operation.

Figure 10:
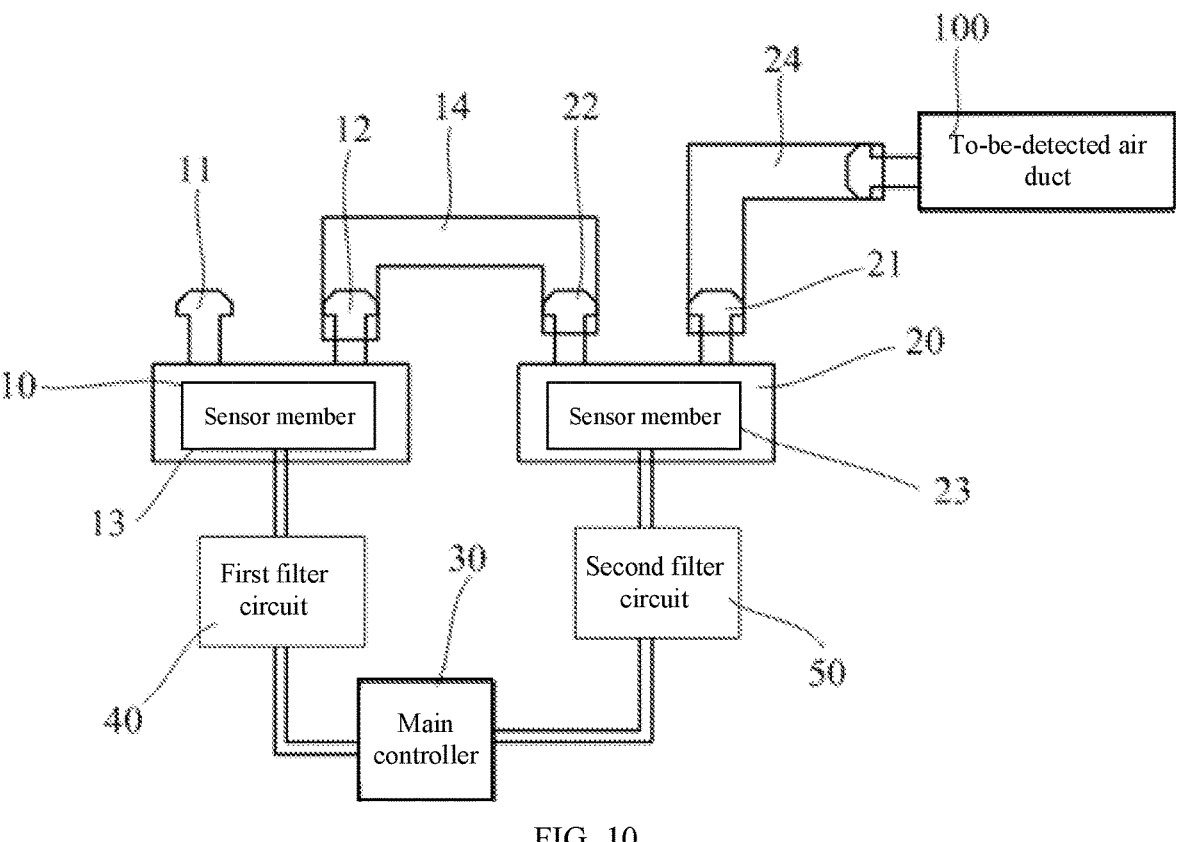
FIG. 10 is a schematic structural diagram of still yet another embodiment of an air pressure detection device of the present disclosure.

As illustrated in FIG. 10, to improve accuracy of the air pressure detection device and to prevent noise signals from affecting the detection result or bringing about an erroneous determination and undesired protection, a filter circuit connected in series between each of the two air pressure detectors and the main controller 30 is further provided according to the embodiment. That is, the air pressure detection device further includes a first filter circuit 40 and a second filter circuit 50.

The first filter circuit 40 is disposed in series between the first air pressure detector 10 and the main controller 30.

The second filter circuit 50 is disposed in series between the second air pressure detector 20 and the main controller 30.

The first filter circuit 40 and the second filter circuit 50 may be implemented as a hardware circuit composed of discrete elements such as a capacitor, an inductor, a resistor, etc., or a filtering algorithm may be integrated in the main controller 30, to smooth the detected analog voltage values or to realize stabilization of on/off signals.

The present disclosure further provides a combustor. The combustor includes a housing (not illustrated), an air supply assembly (not illustrated), and the above-mentioned air pressure detection device.

The combustion chamber is formed in the housing.

The air supply assembly is disposed in the housing.

The air pressure detection device is configured to detect an atmospheric pressure outside the housing and an air pressure of the air supply assembly, and control, based on a detection result, the combustor to operate.

A detailed structure of the air pressure detection device may be referred to the above-mentioned embodiments and will not be repeated herein. It should be understood that, since the above-mentioned air pressure detection device is applied in the combustor of the present disclosure, embodiments of the combustor of the present disclosure include all the embodiments of the above-mentioned air pressure detection device, and can achieve the same effects, thus details thereof will be omitted herein.

In the embodiment, the combustion chamber may be formed on housing. The corresponding air supply assembly has an air opening in communication with the combustion chamber. The combustor further has a gas outlet in communication with the combustion chamber. Or, two combustion chambers are formed on the housing, e.g., an MILD combustion chamber and the preheating combustion chamber. Two air outlets may be formed on the air supply assembly and in communication with the two combustion chambers, respectively. Similarly, the combustor further has two gas outlets in communication with the MILD combustion chamber and the preheating combustion chamber, respectively. The combustion chamber combustor further includes an electric control assembly. A combustion body further includes a water inlet pipe configured to introduce incoming water into the gas water heater, the hot-water outlet pipe configured to provide hot water to the ambient environment, the smoke exhaust pipe connected to the smoke exhaust opening, a gas inlet pipeline configured to access the gas, and a gas inlet valve, which can be components in the related art, and will not be elaborated herein.

As illustrated in FIG. 7 to FIG. 10, in an embodiment, an air pressure sampling through hole is formed on the housing. The first pressure measurement hole 11 of the first air pressure detector 10 in the air pressure detection device is in communication with an atmosphere through the air pressure sampling through hole.

In the embodiment, the air pressure sampling through hole is formed on the housing. The first pressure measurement hole 11 of the first air pressure detector 10 is in communication with the air pressure sampling through hole formed on the housing of the electrical appliance, or the first pressure measurement hole 11 of the first air pressure detector 10 is extended outside the housing through the air pressure sampling through hole, to detect the atmospheric pressure of the environment where the electrical appliance is located.

As illustrated in FIG. 7 to FIG. 10, in an embodiment, the air pressure detection device is configured to control, in response to determining that the air supply assembly has a fault based on the detection signal outputted from the first air pressure detector 10 and the detection signal outputted from the second air pressure detector 20, the gas water heater to stop operation; and control, in response to determining that the air supply assembly is in a normal operation based on the detection signal outputted from the first air pressure detector 10 and the detection signal outputted from the second air pressure detector 20, the gas water heater to start or to continue operation.

The air pressure detection device is further configured to control, in response to determining that the first air pressure detector 10 and/or the second air pressure detector 20 has a fault based on the detection signal outputted from the first air pressure detector 10 and the detection signal outputted from the second air pressure detector 20, the gas water heater to stop operation; and control, in response to determining that each of the first air pressure detector 10 and the second air pressure detector 20 is in a normal operation based on the detection signal outputted from the first air pressure detector 10 and the detection signal outputted from the second air pressure detector 20, the gas water heater to start or to continue operation.

In the embodiment, the gas water heater may further be provided with the flowmeter. The flowmeter can be configured to detect the water flow in real time. When no water flow is detected, i.e., in the absence of water, the gas water heater is in the non-operation state, and the fan is in non-operation. In this case, the air pressures in the cavities are detected through the first air pressure detector 10 and the second air pressure detector 20 to form corresponding on/off signals or analog voltage values. For example, analog voltage values are used as an implementation. The first air pressure detector 10 and the second air pressure detector 20 are configured to complete detection, and output two analog voltage values, represented by a U air pressure 1 and a U air pressure 2, respectively. The values the U air pressure 1 and the U air pressure 2 are compared with each other subsequent to a filtering processing on the U air pressure 1 and the U air pressure 2. When the U air pressure 1 and the U air pressure 2 are equal or have a difference falling within the acceptable error range, the first air pressure detector 10 and the second air pressure detector 20 are determined to be in normal operations, and the combustor can operate normally. Otherwise, a fault is reported, and no start-up operation is performed.

When the water flow is detected, the gas water heater needs to be ignited or is already in the fire state, and the fan is in operation. In this case, air pressure switch or air pressure sensor values the U air pressure 1 and the U air pressure 2 are collected. The gas water heater needs to be ignited or is already in the fire state, and the fan is in operation. The first air pressure detector 10 and the second air pressure detector 20 are configured to complete detection, and output the U air pressure 1 and the U air pressure 2. The values the U air pressure 1 and the U air pressure 2 are compared with each other subsequent to the filtering processing on the U air pressure 1 and the U air pressure 2. When the U air pressure 1 and the U air pressure 2 have equal values or have the difference falling within the acceptable error range, a normal operation can be performed. In this case, the gas water heater is controlled to start. The signal processor 32 is configured to determine, in response to determining that the U air pressure 1 and the U air pressure 2 have different values or have the difference exceeding the acceptable error range based on the result of the comparison from the comparator 31, that the air blockage occurs in the to-be-detected air duct 100 or that the first pressure control switch 132 and/or the second pressure control switch 232 has a fault. In this case, the gas water heater can be controlled to stop operation.

As illustrated in FIG. 7 to FIG. 10, in an embodiment, the air supply assembly includes an air intake inlet, an air outlet, and a fan.

The air intake inlet is in communicate with an air intake opening on the housing. The air outlet is in communicate with the combustion chamber.

The fan is disposed in the air duct formed by the air intake inlet and the air outlet. The second air pressure detector 20 of the air pressure detection device is disposed on the fan.

In the embodiment, the fan, under control of the main controller 30, is configured to adjust the rotational speed to provide a corresponding amount of air to the combustor in different operation conditions. In each operation condition, an amount of air drawn by the fan is substantially kept the same. That is, the pressure in the air duct is substantially kept the same. When the fan is stalled or the air blockage occurs in the air duct, the pressure in the air duct changes. By disposing the second pressure measurement hole 22 of the second air pressure detector 20 on the fan, the air pressure in the air duct can be detected in time to determine whether the air blockage occurs in the air duct.

As illustrated in FIG. 7 to FIG. 10, in an embodiment, the air supply assembly further includes a venturi tube.

The venturi tube is configured to communicate the air intake inlet with the air outlet. The second air pressure detector 20 of the air pressure detection device is disposed on the venturi tube.

The combustor may further be provided with the gas inlet pipe. The venturi tube is located between the air intake inlet and the air outlet of the to-be-detected air duct 100. The inner wall the venturi tube and the inner wall of the air duct together form the gas distribution cavity in communication with the gas inlet pipe. Air may enter the venturi tube from the air intake inlet of the air duct and form the air vortex at the outlet of the venturi tube. The air vortex may entrain the gas ejected by the annular orifice to fully mix the gas with the air in the air duct. Such a fully mixed mixture of the gas and air can be adequately combusted in the gas water heater, which can improve the combustion efficiency, and reduce the amount of produced harmful substances such as nitrogen oxides (NOx) and carbon monoxide. In the embodiment, the venturi tube is configured to communicate the air intake inlet with the air outlet. When the fan is stalled or the air blockage occurs in the air duct, the pressure in the air duct changes. By disposing the second pressure measurement hole 22 of the second air pressure detector 20 on the venturi tube, the air pressure in the air duct can be detected in time to determine whether the air blockage occurs in the air duct.

The present disclosure further provides a gas water heater. The gas water heater includes the above-mentioned air pressure detection device or the above-mentioned combustor.

Detailed structures of the combustor and the air pressure detection device may be referred to the above-mentioned embodiments and will not be repeated herein. It should be understood that, since the above-mentioned combustor and air pressure detection device are applied in the gas water heater of the present disclosure, embodiments of the gas water heater of the present disclosure include all the embodiments of the above-mentioned combustor and air pressure detection device, and can achieve the same effects, thus details thereof will be omitted herein.

While several embodiments of the present disclosure are described above, the protection scope of the present disclosure is not limited to these embodiments. Any equivalent structural change made under the concept of the present disclosure using contents of the specification and the accompanying drawings of the present disclosure, or direct/indirect applications of the present disclosure in other related fields shall fall within the protection scope of the present disclosure.

What is claimed is:

1. A method for controlling a gas water heater, the gas water heater comprising a combustion chamber having a combustor, an air intake fan configured to supply air to the combustion chamber, and a condensate water assembly configured to receive and discharge condensate water, the method for controlling the gas water heater comprising:
    acquiring an air intake pressure value of the air intake fan;
    acquiring a water seal protection pressure threshold of the condensate water assembly; and
    controlling, in response to determining based on the air intake pressure value and an intake air pressure threshold that a water seal of the condensate water assembly has a fault, the gas water heater to stop operation:
    wherein the intake air pressure threshold comprises a water seal blown-away air pressure alert value and a water seal blown-away air pressure critical value smaller than the water seal blown-away air pressure alert value.

2. The method for controlling the gas water heater according to claim 1, wherein said acquiring the air intake pressure value of the air intake fan comprises:
    acquiring a current rotational speed of the air intake fan; and
    obtaining, by calculating based on the current rotational speed of the air intake fan, the intake air pressure threshold corresponding to the water seal protection pressure threshold of the condensate water assembly.

3. The method for controlling the gas water heater according to claim 1, wherein said controlling, in response to determining based on the air intake pressure value and the intake air pressure threshold that the water seal of the condensate water assembly has the fault, the air intake fan to stop an air intake operation comprises:

determining, when the air intake pressure value is smaller than the water seal blown-away air pressure alert value, that the water seal of the condensate water assembly is at risk of being blown away, and controlling a pre-mixer to stop operation.

4. The method for controlling the gas water heater according to claim 1, wherein:
    said acquiring the air intake pressure value of the air intake fan comprises:
    acquiring the air intake pressure values several times within a first predetermined duration; and
    said controlling, in response to determining based on the air intake pressure value and the intake air pressure threshold that the water seal of the condensate water assembly has the fault, the air intake fan to stop the air intake operation comprises:
    averaging the acquired air intake pressure values several times to obtain an average air pressure value within the first predetermined duration; and
    controlling, when the average air pressure value within the first predetermined duration is greater than the water seal blown-away air pressure critical value and smaller than the water seal blown-away air pressure alert value, a pre-mixer to stop operation.

5. The method for controlling the gas water heater according to claim 4, wherein:
    said acquiring the air intake pressure value of the air intake fan comprises:
    acquiring the air intake pressure values several times within the first predetermined duration; and
    said determining, when the air intake pressure value is smaller than the water seal blown-away air pressure alert value, that the water seal of the condensate water assembly has the fault, and controlling the pre-mixer to stop the air intake operation comprises:
    acquiring air pressure values of the pre-mixer several times within a second predetermined duration; and
    controlling, when a minimum air pressure value of the air pressure values within the second predetermined duration is smaller than the water seal blown-away air pressure critical value, the gas water heater to stop operation.

6. The method for controlling the gas water heater according to claim 1, wherein said controlling, in response to determining based on a water seal blown-away threshold and the air intake pressure value that the water seal of the condensate water assembly has the fault, a pre-mixer to stop the air intake operation comprises:
    controlling, in response to acquiring that a difference between two adjacent air intake pressure values is greater than a predetermined threshold, the pre-mixer to stop the air intake operation.

7. An apparatus, comprising:
    a processor;
    a memory; and
    a gas water heater control program stored on the memory and executable on the processor,
    wherein the gas water heater control program, when executed by the processor, is configured to implement the steps of the method for controlling the gas water heater according to claim 1.

8. A gas water heater, wherein the gas water heater is provided with a cold-water inlet pipe and a hot-water outlet pipe, the gas water heater comprising:
    a pre-mixer comprising a premixing chamber and an air intake fan disposed in the premixing chamber;

a combustor having a combustion chamber and in communication with the premixing chamber;

a condensate water assembly in communication with the combustion chamber; and an apparatus for controlling the gas water heater, wherein the apparatus is configured to control, in response to determining based on an acquired air intake pressure value and an intake air pressure threshold that a water seal of the condensate water assembly has a fault, the gas water heater to stop operation;

wherein the intake air pressure threshold comprises a water seal blown-away air pressure alert value and a water seal blown-away air pressure critical value smaller than the water seal blown-away air pressure alert value.

9. The gas water heater according to claim 8, further comprising an air pressure detection device configured to detect an air intake air pressure value in the pre-mixer, a pressure measurement hole of the air pressure detection device being formed in the pre-mixer, wherein the pre-mixer comprises:

an air inlet;

a gas inlet; and a venturi tube having a first air intake inlet in communication with the air inlet, a second air intake inlet in communication with the gas inlet, and an air outlet in communication with the premixing chamber.

10. The gas water heater according to claim 8, wherein the condensate water assembly comprises:

a condensate water drain pipe in communication with the combustion chamber;

a flow guide structure disposed at a lower end of a gas chamber; and a condensate water collection portion at a position corresponding to the flow guide structure, wherein the condensate water drain pipe is in communication with the combustion chamber through the condensate water collection portion.

11. A non-transitory computer-readable storage medium, having a gas water heater control program stored thereon, wherein the gas water heater control program, when executed by a processor, causes the processor to:

acquire an air intake pressure value of an air intake fan;

acquire a water seal protection pressure threshold of a condensate water assembly; and control, in response to determining based on the air intake pressure value and an intake air pressure threshold that a water seal of the condensate water assembly has a fault, the gas water heater to stop operation;

wherein the intake air pressure threshold comprises a water seal blown-away air pressure alert value and a water seal blown-away air pressure critical value smaller than the water seal blown-away air pressure alert value.

12. The non-transitory computer-readable storage medium for controlling the gas water heater according to claim 11, wherein said acquiring the air intake pressure value of the air intake fan comprises:

acquiring a current rotational speed of the air intake fan; and obtaining, by calculating based on the current rotational speed of the air intake fan, the intake air pressure threshold corresponding to the water seal protection pressure threshold of the condensate water assembly.

13. The non-transitory computer-readable storage medium for controlling the gas water heater according to claim 5, wherein said controlling, in response to determining based on the air intake pressure value and the intake air pressure threshold that the water seal of the condensate water assembly has the fault, the air intake fan to stop an air intake operation comprises:

determining, when the air intake pressure value is smaller than the water seal blown-away air pressure alert value, that the water seal of the condensate water assembly is at risk of being blown away, and controlling a pre-mixer to stop operation.

14. The non-transitory computer-readable storage medium for controlling the gas water heater according to claim 5, wherein:

said acquiring the air intake pressure value of the air intake fan comprises:

acquiring the air intake pressure values several times within a first predetermined duration; and said controlling, in response to determining based on the air intake pressure value and the intake air pressure threshold that the water seal of the condensate water assembly has the fault, the air intake fan to stop the air intake operation comprises:

averaging the acquired air intake pressure values several times to obtain an average air pressure value within the first predetermined duration; and controlling, when the average air pressure value within the first predetermined duration is greater than the water seal blown-away air pressure critical value and smaller than the water seal blown-away air pressure alert value, a pre-mixer to stop operation.

15. The non-transitory computer-readable storage medium for controlling the gas water heater according to claim 14, wherein:

said acquiring the air intake pressure value of the air intake fan comprises:

acquiring the air intake pressure values several times within the first predetermined duration; and said determining, when the air intake pressure value is smaller than the water seal blown-away air pressure alert value, that the water seal of the condensate water assembly has the fault, and controlling the pre-mixer to stop the air intake operation comprises:

acquiring air pressure values of the pre-mixer several times within a second predetermined duration; and controlling, when a minimum air pressure value of the air pressure values within the second predetermined duration is smaller than the water seal blown-away air pressure critical value, the gas water heater to stop operation.

16. The non-transitory computer-readable storage medium for controlling the gas water heater according to claim 11, wherein said controlling, in response to determining based on a water seal blown-away threshold and the air intake pressure value that the water seal of the condensate water assembly has the fault, a pre-mixer to stop the air intake operation comprises:

controlling, in response to acquiring that a difference between two adjacent air intake pressure values is greater than a predetermined threshold, the pre-mixer to stop the air intake operation.

* * * * *